(12) United States Patent
Dai et al.

(10) Patent No.: US 11,770,171 B2
(45) Date of Patent: Sep. 26, 2023

(54) RECONFIGURABLE INTELLIGENT SURFACE LINK IDENTIFICATION

(71) Applicant: QUALCOMM Incorporated, San Diego, CA (US)

(72) Inventors: Yucheng Dai, San Diego, CA (US); Wooseok Nam, San Diego, CA (US); Tao Luo, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/305,002

(22) Filed: Jun. 29, 2021

(65) Prior Publication Data

US 2022/0416869 A1 Dec. 29, 2022

(51) Int. Cl.
*H04B 7/06* (2006.01)
(52) U.S. Cl.
CPC .................. *H04B 7/0684* (2013.01)
(58) Field of Classification Search
CPC . H04B 7/145; H04B 7/15; H04B 7/14; H04B 7/0684; H04B 7/026; H04B 7/15528; H04B 7/024; H04L 5/0094; H04W 16/28; H04W 16/26; H04W 72/23
See application file for complete search history.

(56) References Cited

U.S. PATENT DOCUMENTS

| 11,570,629 B2* | 1/2023 | Haija ................... H04B 17/336 |
| 2013/0242890 A1* | 9/2013 | He .......................... H04L 65/75 370/329 |
| 2015/0009952 A1* | 1/2015 | Berggren .............. H04L 5/0044 370/330 |
| 2022/0052764 A1* | 2/2022 | Medra .................... H04L 27/38 |

FOREIGN PATENT DOCUMENTS

WO    WO-2022150118 A1 *  7/2022

* cited by examiner

*Primary Examiner* — Sophia Vlahos
(74) *Attorney, Agent, or Firm* — QUALCOMM Incorporated

(57) ABSTRACT

Various aspects of the present disclosure generally relate to wireless communication. In some aspects, a receiver may receive, from a transmitter, an indication of a signature of a reconfigurable intelligent surface (RIS). The receiver may receive a signal that is transmitted by the transmitter and redirected by the RIS. The receiver may receive, from the RIS, a sequence associated with the signature of the RIS indicating that the signal is transmitted using a link associated with the RIS. Numerous other aspects are described.

30 Claims, 11 Drawing Sheets

RECONFIGURABLE INTELLIGENT SURFACE LINK IDENTIFICATION

FIELD OF THE DISCLOSURE

Aspects of the present disclosure generally relate to wireless communication and to techniques and apparatuses for reconfigurable intelligent surface (RIS) link identification.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. NR, which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a receiver for wireless communication. The receiver may include a memory and one or more processors coupled to the memory. The one or more processors may be configured to receive, from a transmitter, an indication of a signature of a reconfigurable intelligent surface (RIS). The one or more processors may be configured to receive a signal that is transmitted by the transmitter and redirected by the RIS. The one or more processors may be configured to receive, from the RIS, a sequence associated with the signature of the RIS indicating that the signal is transmitted using a link associated with the RIS.

Some aspects described herein relate to a transmitter for wireless communication. The transmitter may include a memory and one or more processors coupled to the memory. The one or more processors may be configured to transmit, to at least one of a receiver or an RIS, an indication of a signature of the RIS. The one or more processors may be configured to transmit a signal that is to be redirected to the receiver by the RIS using a link that is identified by a sequence associated with the signature of the RIS.

Some aspects described herein relate to an RIS for wireless communication. The reconfigurable intelligent surface may include a memory and one or more processors coupled to the memory. The one or more processors may be configured to receive, from a transmitter, an indication of a signature of the RIS. The one or more processors may be configured to receive and redirecting a signal, that is transmitted by the transmitter, to a receiver. The one or more processors may be configured to transmit, to the receiver, a sequence associated with the signature of the RIS indicating that the signal is transmitted using a link associated with the RIS.

Some aspects described herein relate to a method of wireless communication performed by a receiver. The method may include receiving, from a transmitter, an indication of a signature of an RIS. The method may include receiving a signal that is transmitted by the transmitter and redirected by the RIS. The method may include receiving, from the RIS, a sequence associated with the signature of the RIS indicating that the signal is transmitted using a link associated with the RIS.

Some aspects described herein relate to a method of wireless communication performed by a transmitter. The method may include transmitting, to at least one of a receiver or an RIS, an indication of a signature of the RIS. The method may include transmitting a signal that is to be redirected to the receiver by the RIS using a link that is identified by a sequence associated with the signature of the RIS.

Some aspects described herein relate to a method of wireless communication performed by an RIS. The method may include receiving, from a transmitter, an indication of a signature of the RIS. The method may include receiving and redirecting a signal, that is transmitted by the transmitter, to a receiver. The method may include transmitting, to the receiver, a sequence associated with the signature of the RIS indicating that the signal is transmitted using a link associated with the RIS.

Some aspects described herein relate to a non-transitory computer-readable medium that stores a set of instructions for wireless communication by a receiver. The set of instructions, when executed by one or more processors of the receiver, may cause the receiver to receive, from a transmitter, an indication of a signature of an RIS. The set of instructions, when executed by one or more processors of the receiver, may cause the receiver to receive a signal that is transmitted by the transmitter and redirected by the RIS. The set of instructions, when executed by one or more processors of the receiver, may cause the receiver to receive, from the RIS, a sequence associated with the signature of the RIS indicating that the signal is transmitted using a link associated with the RIS.

Some aspects described herein relate to a non-transitory computer-readable medium that stores a set of instructions for wireless communication by a transmitter. The set of instructions, when executed by one or more processors of the transmitter, may cause the transmitter to transmit, to at least one of a receiver or an RIS, an indication of a signature of the RIS. The set of instructions, when executed by one or more processors of the transmitter, may cause the transmitter to transmit a signal that is to be redirected to the receiver by the RIS using a link that is identified by a sequence associated with the signature of the RIS.

Some aspects described herein relate to a non-transitory computer-readable medium that stores a set of instructions for wireless communication by a one or more instructions that, when executed by one or more processors of an RIS. The set of instructions, when executed by one or more processors of the one or more instructions that, when executed by one or more processors of an RIS, may cause the one or more instructions that, when executed by one or more processors of an RIS to receive, from a transmitter, an indication of a signature of the RIS. The set of instructions, when executed by one or more processors of the one or more instructions that, when executed by one or more processors of an RIS, may cause the one or more instructions that, when executed by one or more processors of an RIS to receive and redirecting a signal, that is transmitted by the transmitter, to a receiver. The set of instructions, when executed by one or more processors of the one or more instructions that, when executed by one or more processors of an RIS, may cause the one or more instructions that, when executed by one or more processors of an RIS to transmit, to the receiver, a sequence associated with the signature of the RIS indicating that the signal is transmitted using a link associated with the RIS.

Some aspects described herein relate to an apparatus for wireless communication. The apparatus may include means for receiving, from a transmitter, an indication of a signature of an RIS. The apparatus may include means for receiving a signal that is transmitted by the transmitter and redirected by the RIS. The apparatus may include means for receiving, from the RIS, a sequence associated with the signature of the RIS indicating that the signal is transmitted using a link associated with the RIS.

Some aspects described herein relate to an apparatus for wireless communication. The apparatus may include means for transmitting, to at least one of a receiver or an RIS, an indication of a signature of the RIS. The apparatus may include means for transmitting a signal that is to be redirected to the receiver by the RIS using a link that is identified by a sequence associated with the signature of the RIS.

Some aspects described herein relate to an apparatus for wireless communication. The apparatus may include means for receiving, from a transmitter, an indication of a signature of the apparatus. The apparatus may include means for receiving and redirecting a signal, that is transmitted by the transmitter, to a receiver.

The apparatus may include means for transmitting, to the receiver, a sequence associated with the signature of the RIS indicating that the signal is transmitted using a link associated with the apparatus.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
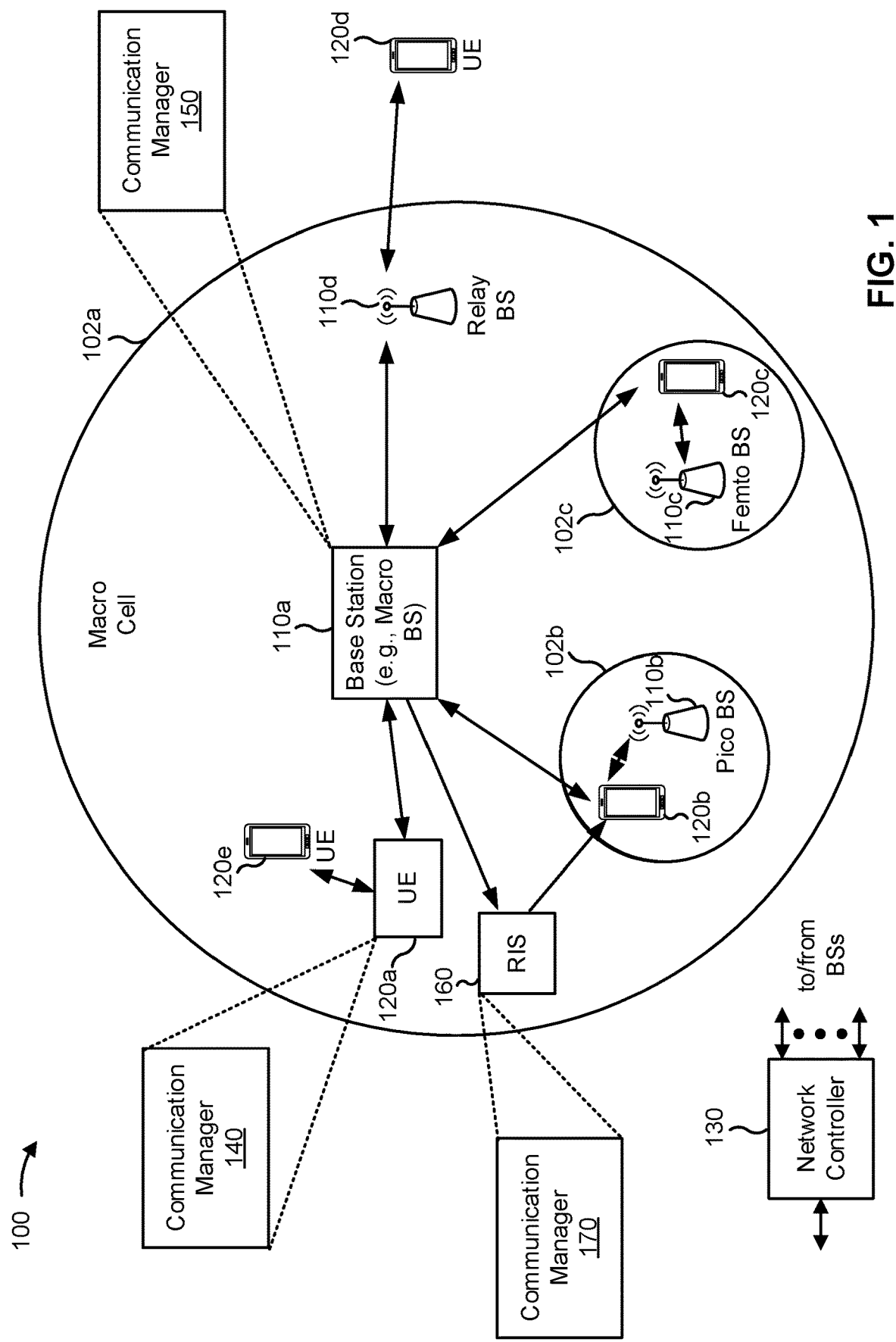
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110*a*, a BS 110*b*, a BS 110*c*, and a BS 110*d*), a user equipment (UE) 120 or multiple UEs 120 (shown as a UE 120*a*, a UE 120*b*, a UE 120*c*, a UE 120*d*, and a UE 120*e*), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110*a* may be a macro base station for a macro cell 102*a*, the BS 110*b* may be a pico base station for a pico cell 102*b*, and the BS 110*c* may be a femto base station for a femto cell 102*c*. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile.

A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a receiver (e.g., shown as a UE 120 in FIG. 1) may include a communication manager 140. As described in more detail elsewhere herein, the communication manager 140 may receive, from a transmitter, an indication of a signature of a reconfigurable intelligent surface (RIS) 160; receive a signal that is transmitted by the transmitter and redirected by the RIS; and receive, from the RIS 160, a sequence associated with the signature of the RIS indicating that the signal is transmitted using a link associated with the RIS. Additionally, or alternatively, the communication manager 140 may perform one or more other operations described herein.

In some aspects, a transmitter (shown as the base station 110 in FIG. 1) may include a communication manager 150. As described in more detail elsewhere herein, the communication manager 150 may transmit, to at least one of a receiver or an MS 160, an indication of a signature of the RIS; and transmit a signal that is to be redirected to the receiver by the RIS 160 using a link that is identified by a sequence associated with the signature of the RIS 160. Additionally, or alternatively, the communication manager 150 may perform one or more other operations described herein.

As shown in FIG. 1, the wireless network 100 may include the RIS 160. The RIS 160 may include a communication manager 170. The RIS 160 may include one or more reconfigurable elements capable of redirecting or reflecting signals transmitted by a base station 110 or a UE 120.

In some aspects, the RIS 160 may include a communication manager 170. As described in more detail elsewhere herein, the communication manager 170 may receive, from a transmitter, an indication of a signature of the RIS 160; receive and redirect a signal, that is transmitted by the transmitter, to a receiver; and transmit, to the receiver, a sequence associated with the signature of the RIS 160 indicating that the signal is transmitted using a link associated with the RIS 160. Additionally, or alternatively, the communication manager 170 may perform one or more other operations described herein.

As indicated above, FIG. 1 is provided as an example. Other examples may differ from what is described with regard to FIG. 1.

Figure 2:
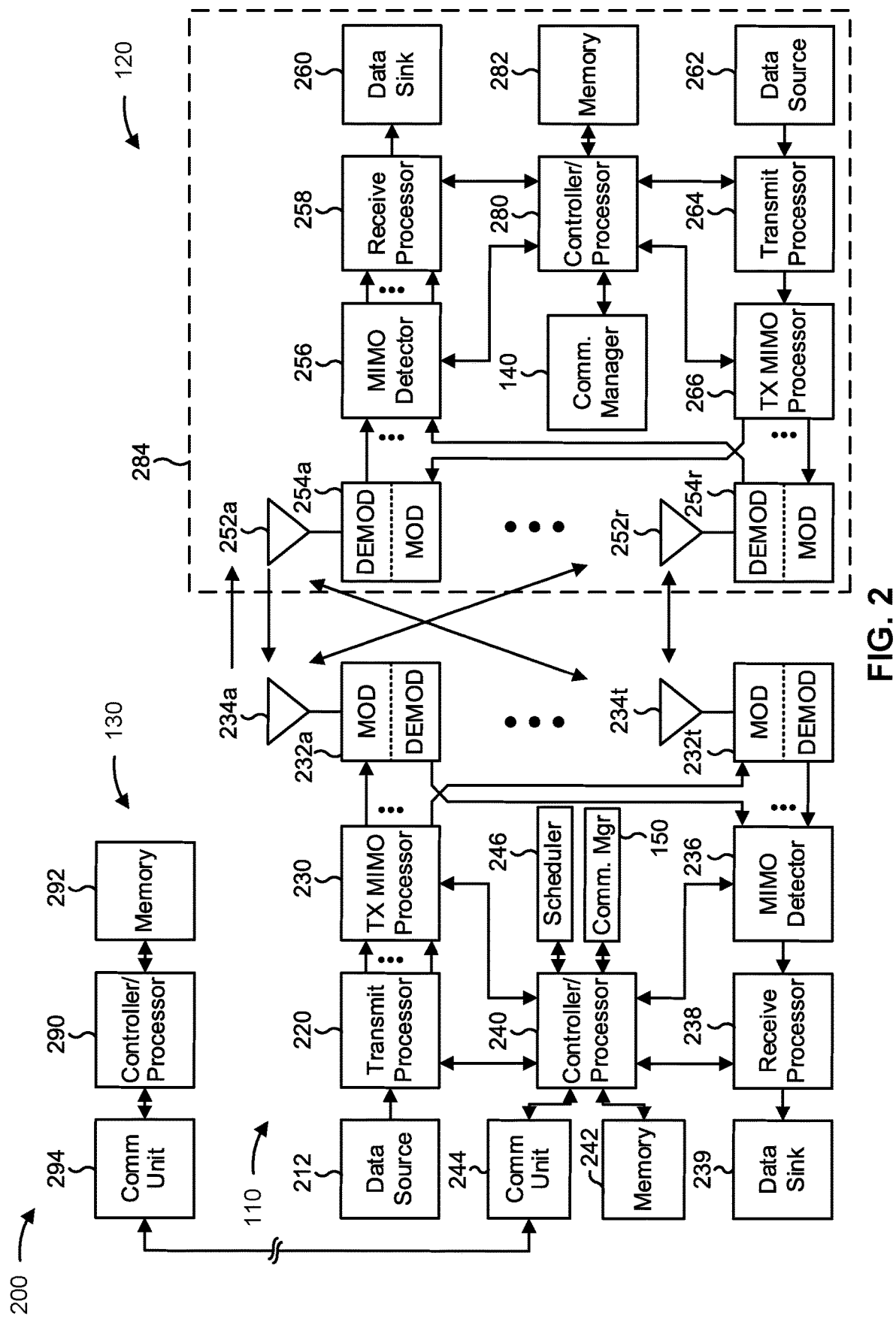
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T>1). The UE 120 may be equipped with a set of antennas 252a through 252r, such as R antennas (R>1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The UE 120 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-8).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-8).

The controller/processor 240 of the base station 110, the controller/processor 280 of the UE 120, a controller/processor of an RIS (not shown in FIG. 2), and/or any other component(s) of FIG. 2 may perform one or more techniques associated with RIS link identification, as described in more detail elsewhere herein. In some aspects, transmitter described herein is the base station 110 or the UE 120, is included in the base station 110 or the UE 120, or includes one or more components of the base station 110 or the UE 120 shown in FIG. 2. In some aspects, the receiver described herein is the UE 120, is included in the UE 120, or includes one or more components of the UE 120 shown in FIG. 2.

Figure 6:
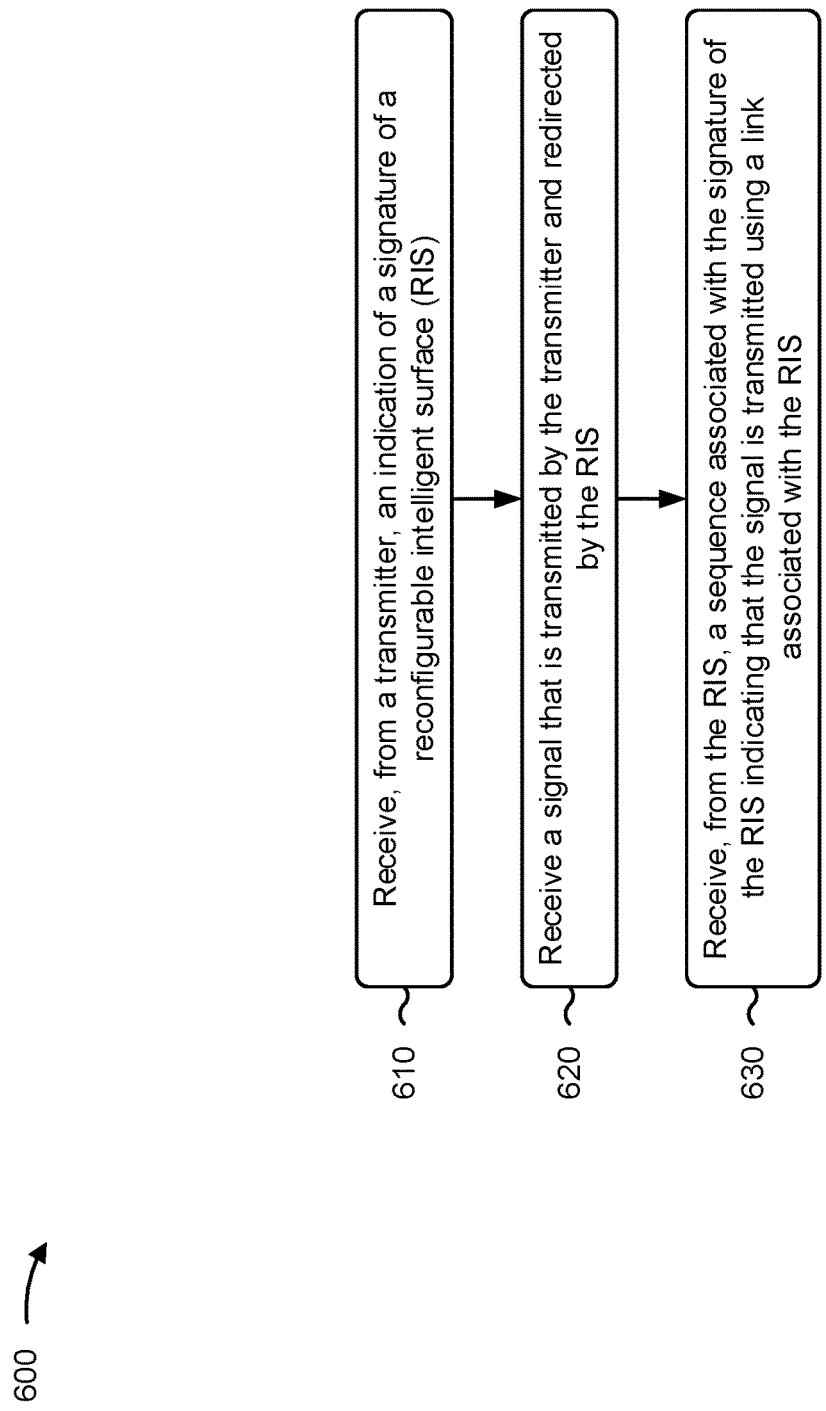
FIGS. 6-8 are diagrams illustrating example processes associated with MS link identification, in accordance with the present disclosure.
Figure 7:
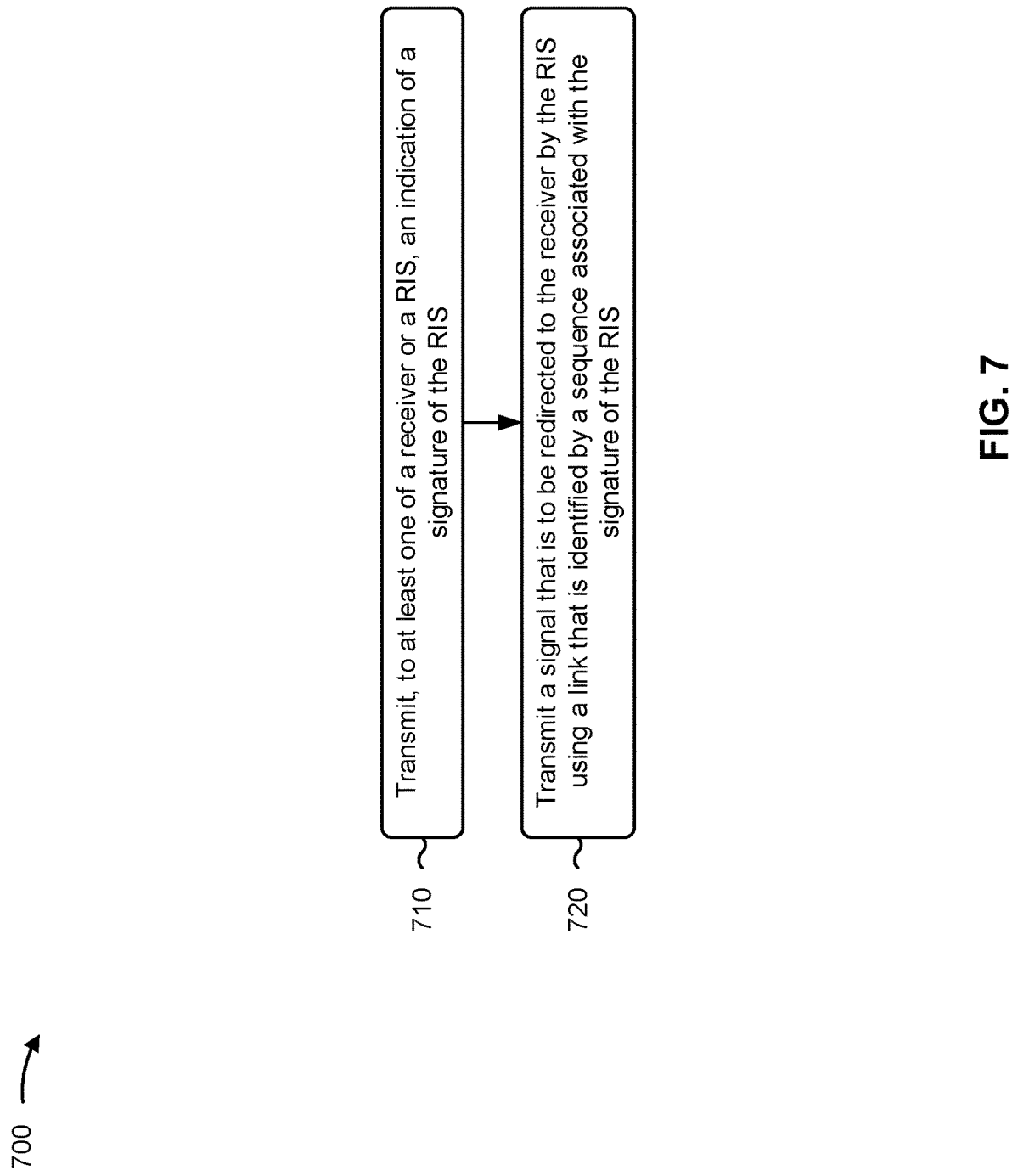
Figure 8:
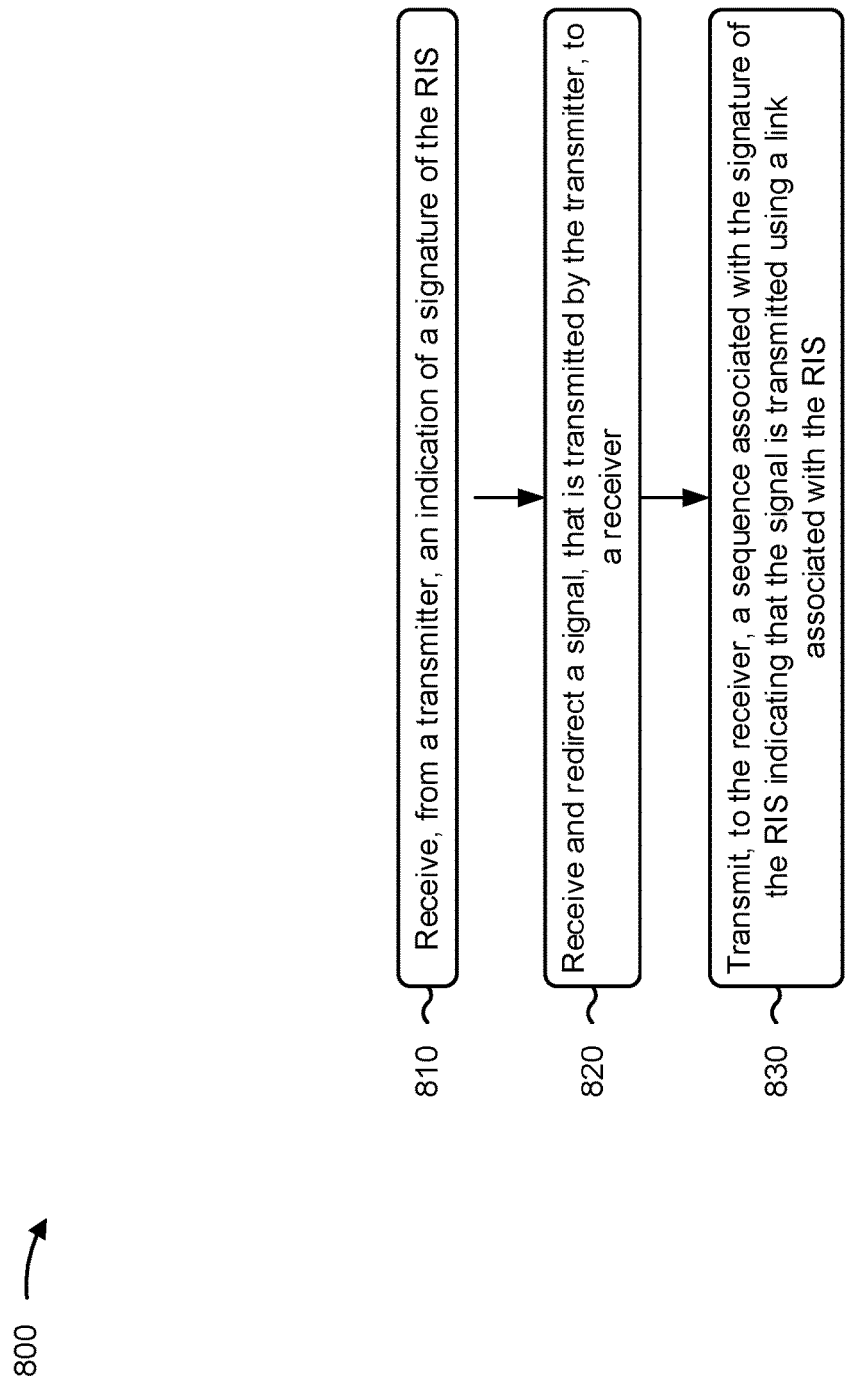

For example, the controller/processor 240 of the base station 110, the controller/processor 280 of the UE 120, the controller/processor of the RIS (not shown in FIG. 2), and/or any other component(s) of FIG. 2 may perform or direct operations of, for example, process 600 of FIG. 6, process 700 of FIG. 7, process 800 of FIG. 8, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, process 800 of FIG. 8, and/or other processes as described herein. In some examples, executing instructions may include running the instructions, converting the instructions, compiling the instructions, and/or interpreting the instructions, among other examples.

In some aspects, the receiver includes means for receiving, from a transmitter, an indication of a signature of an RIS; means for receiving a signal that is transmitted by the transmitter and redirected by the RIS; and/or means for receiving, from the RIS, a sequence associated with the signature of the RIS indicating that the signal is transmitted using a link associated with the RIS. In some aspects, the means for the receiver to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246. In some aspects, the means for the receiver to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the transmitter includes means for transmitting, to at least one of a receiver or an RIS, an indication of a signature of the RIS; and/or means for transmitting a signal that is to be redirected to the receiver by the RIS using a link that is identified by a sequence associated with the signature of the RIS. In some aspects, the means for the transmitter to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246. In some aspects, the means for the transmitter to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the RIS includes means for receiving, from a transmitter, an indication of a signature of the RIS; means for receiving and redirecting a signal, that is transmitted by the transmitter, to a receiver; and/or means for transmitting, to the receiver, a sequence associated with the signature of the RIS indicating that the signal is transmitted using a link associated with the RIS. In some aspects, the means for the MS to perform operations described herein may include, for example, one or more of communication manager 170, a transmit processor, an antenna, a modem, a receive processor, a controller/processor, a memory, and/or one or more reconfigurable elements.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
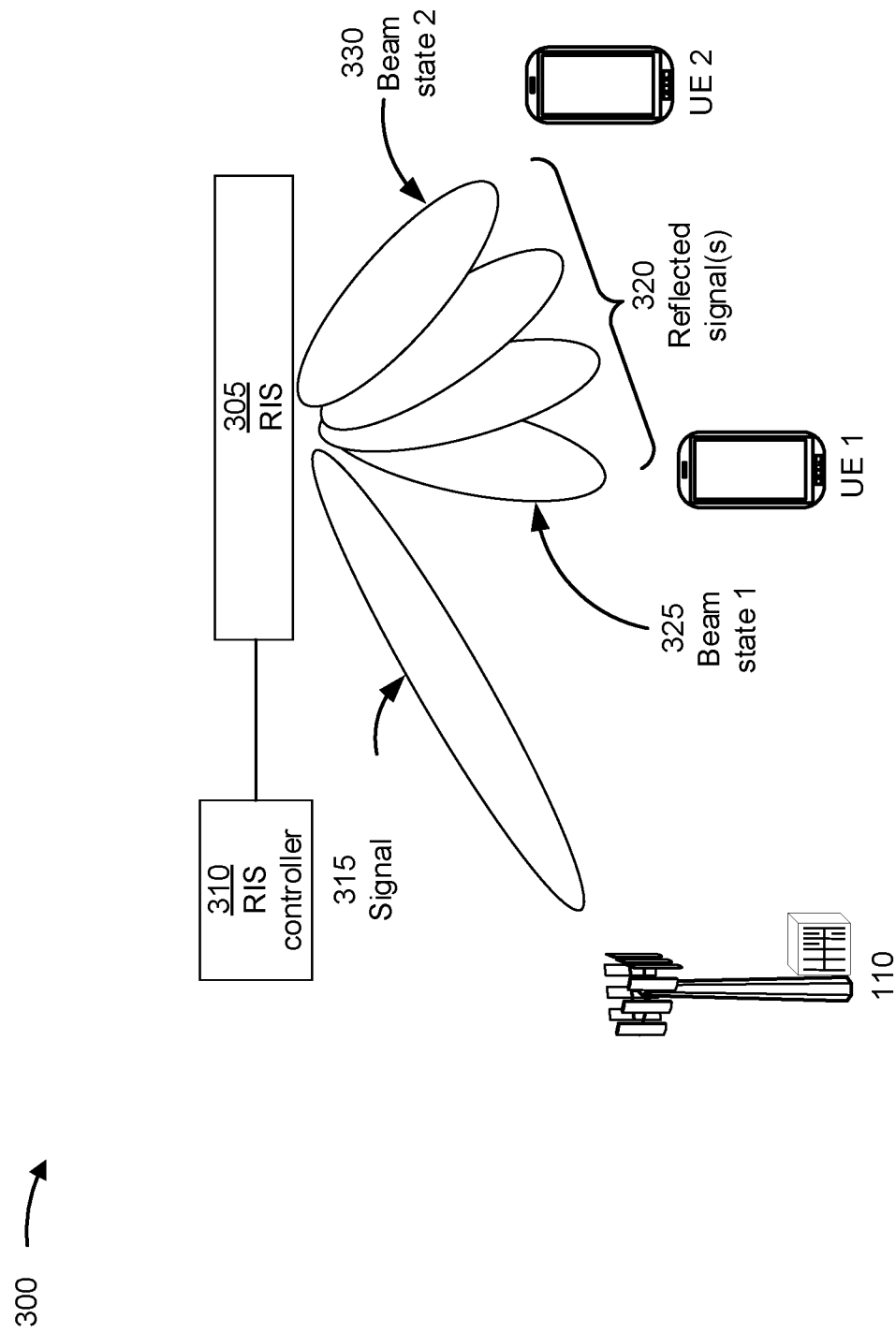
FIG. 3 is a diagram illustrating an example of communications using a reconfigurable intelligent surface (RIS), in accordance with the present disclosure.

FIG. 3 is a diagram illustrating an example 300 of communications using an RIS, in accordance with the present disclosure. As shown in FIG. 3, a base station 110 may communicate with a UE 120 in a wireless network, such as the wireless network 100. The base station 110 and the UE 120 may use an RIS 305 to communicate with one another. For example, the RIS 305 may reflect or redirect a signal to the base station 110 and/or the UE 120. The RIS 305 may also be referred to as an intelligent reflecting surface. In some examples, the RIS 305 may be a repeater.

The RIS 305 may be, or may include, a planar or two-dimensional structure or surface that is designed to have properties to enable a dynamic control of signals or electromagnetic waves reflected and/or redirected by the RIS 305. The RIS 305 may include one or more reconfigurable elements. For example, the RIS 305 may include an array of reconfigurable elements (e.g., an array of uniformly distributed reconfigurable elements). The reconfigurable elements may be elements with a reconfigurable electromagnetic characteristic. For example, the electromagnetic characteristic may include a reflection characteristic (e.g., a reflection coefficient), a scattering characteristic, an absorption characteristic, and/or a diffraction characteristic. The electromagnetic characteristic(s) of each reconfigurable element may be independently controlled and changed over time.

The electromagnetic characteristic(s) of each reconfigurable element may be independently configured such that the combination of configured states of the reconfigurable elements reflects an incident signal or waveform in a controlled manner. For example, the reconfigurable elements may be configured to reflect or redirect an impinging signal in a controlled manner, such as by reflecting the impinging signal in a desired direction, with a desired beam width, with a desired phase, with a desired amplitude, and/or with a desired polarization, among other examples. In other words, the RIS 305 may be capable of modifying one or more properties (e.g., direction, beam width, phase, amplitude, and/or polarization) of an impinging signal.

The reconfigurable elements of the RIS 305 may be controlled and/or configured by an RIS controller 310. The RIS controller 310 may be a control module (e.g., a controller and/or a processor) that is capable of configuring the electromagnetic characteristic(s) of each reconfigurable element of the RIS 305. The RIS controller 310 may be, or may be included in, the communication manager 170. Alternatively, the communication manager 170 may be included in the RIS controller 310. The RIS controller 310 may receive control communications (e.g., from a base station 110 and/or a UE 120) indicating one or more properties of reflected signals (e.g., indicating a desired direction, a desired beam width, a desired phase, a desired amplitude, and/or a desired polarization). Therefore, in some examples, the RIS 305 may be capable of receiving communications (e.g., via the RIS 305 and/or the RIS controller 310). In some examples, the RIS 305 and/or the RIS controller 310 may not have transmit capabilities (e.g., the RIS 305 may be capable of reflecting and/or redirecting impinging signals via the reconfigurable elements, but may not be capable of generating and/or transmitting signals). Alternatively, in some examples, the RIS 305 and/or the RIS controller 310 may have transmit capabilities (e.g., the RIS 305 may be capable of reflecting and/or redirecting impinging signals via the reconfigurable elements and may be capable of generating and/or transmitting signals). For example, the RIS 305 and/or the RIS controller 310 may include one or more antennas and/or antenna elements for receiving and/or transmitting signals.

For example, as shown in FIG. 3, the base station 110 may transmit a signal 315. The signal 315 may be transmitted in a spatial direction toward the RIS 305. The RIS 305 may configure the reconfigurable elements of the RIS 305 to reflect and/or redirect the signal 315 in a desired spatial direction and/or with one or more desired signal characteristics (e.g., beam width, phase, amplitude, frequency, and/or polarization). For example, as shown by reference number 320, the RIS 305 may be capable of reflecting the signal 315 in one or more spatial directions. Although multiple beams are shown in FIG. 3 representing different beam states or beam directions of the RIS 305, the RIS 305 may be capable of reflecting a signal with one beam state or one beam direction at a time. For example, in one case, as shown by reference number 325, the RIS 305 may be configured to reflect the signal 315 using a first beam state (e.g., beam state 1). "Beam state" may refer to a spatial direction and/or a beam of a reflected signal (e.g., a signal reflected by the RIS 305). The first beam state may cause the signal 315 to be reflected in a spatial direction toward a first UE 120 (e.g., UE 1). As shown by reference number 330, in another case, the RIS 305 may be configured to reflect the signal 315 using a second beam state (e.g., beam state 2). The second beam state may cause the signal 315 to be reflected in a spatial direction toward a second UE 120 (e.g., UE 2).

The RIS 305 may be deployed in a wireless network (such as the wireless network 100) to improve communication performance and efficiency. For example, the RIS 305 may enable a transmitter (e.g., a base station 110 or a UE 120) to control the scattering, reflection, and refraction characteristics of signals transmitted by the transmitter, to overcome the negative effects of wireless propagation. For example, the RIS 305 may effectively control signal characteristics (e.g., spatial direction, beam width, phase, amplitude, frequency, and/or polarization) of an impinging signal without a need for complex decoding, encoding, and radio frequency processing operations. Therefore, the RIS 305 may provide increased channel diversity for propagation of signals in a wireless network. The increased channel diversity provides robustness to channel fading and/or blocking, such as when higher frequencies are used by the base station 110 and/or the UE 120 (e.g., millimeter wave frequencies and/or sub-terahertz frequencies). Moreover, as the RIS 305 does not need to perform complex decoding, encoding, and radio frequency processing operations, the RIS 305 may provide a more cost and energy efficient manner of reflecting and/or redirecting signals in a wireless network (e.g., as compared to other mechanisms for reflecting and/or redirecting signals, such as a relay device).

As indicated above, FIG. 3 is provided as an example. Other examples may differ from what is described with respect to FIG. 3.

Figure 4:
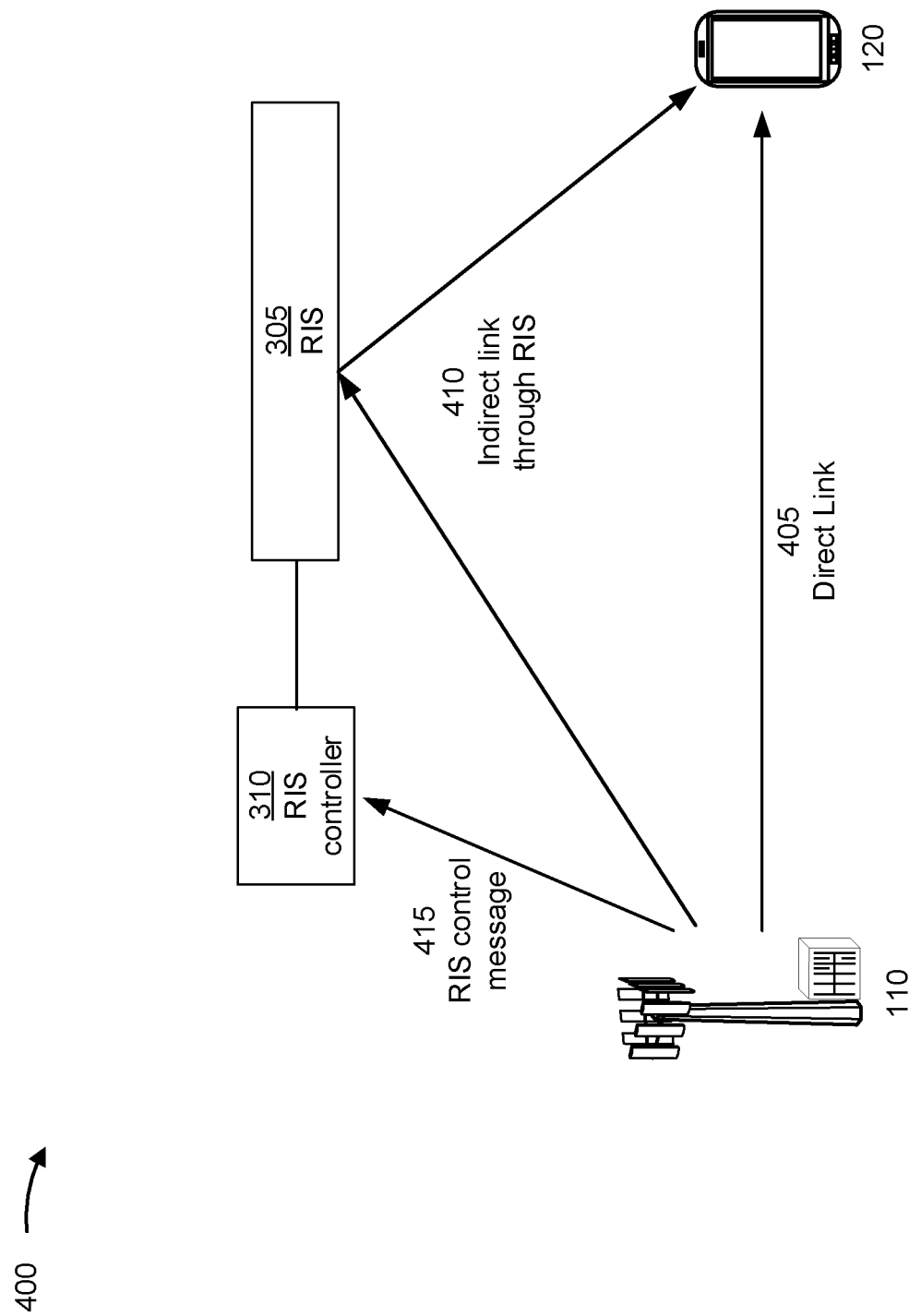
FIG. 4 is a diagram illustrating an example of communication links in a wireless network that includes an RIS, in accordance with the present disclosure.

FIG. 4 is a diagram illustrating an example 400 of communication links in a wireless network that includes an RIS, in accordance with the present disclosure. As shown, example 400 includes a base station 110, a UE 120, and the RIS 305. The RIS 305 may be controlled and/or configured by the RIS controller 310.

As shown in FIG. 4, the UE 120 may receive a communication (e.g., data and/or control information) directly from the base station 110 as a downlink communication. Additionally, or alternatively, the UE 05 may receive a communication (e.g., data and/or control information) indirectly from the base station 110 via the RIS 305. For example, the base station 110 may transmit the communication in a spatial direction toward the RIS 305, and the RIS 305 may redirect or reflect the communication to the UE 120.

In some examples, the UE 120 may communicate directly with the base station 110 via a direct link 405. For example, a communication may be transmitted via the direct link 405. A communication transmitted via the direct link 405 between the UE 120 and the base station 110 does not pass through and is not reflected or redirected by the RIS 305. In some examples, the UE 120 may communicate indirectly with the base station 110 via an indirect link 410. For example, a communication may be transmitted via different segments of the indirect link 410. A communication transmitted via the indirect link 410 between the UE 120 and the base station 110 is reflected and/or redirected by the RIS 305. As shown in FIG. 4 and by reference number 415, the base station 110 may communicate with the RIS 305 (e.g., with the RIS controller 310) via a control channel. For example, the base station 110 may indicate, in an RIS control message, spatial direction(s) and/or signal characteristics for signals reflected by the RIS 305. The RIS controller 310 may configure reconfigurable elements of the RIS 305 in accordance with the RIS control message. In some examples, the RIS control message may indicate information associated with the wireless network, such as a frame structure, time synchronization information, and/or slot boundaries, among other examples. Using the communication scheme shown in FIG. 4 may improve network performance and increase reliability by providing the UE 120 with link diversity for communicating with the base station 110.

In some cases, the UE 120 may receive a communication (e.g., the same communication) from the base station 110 via both the direct link 405 and the indirect link 410. In other cases, the base station 110 may select one of the links (e.g., either the direct link 405 or the indirect link 410), and may transmit a communication to the UE 120 using only the selected link. Alternatively, the base station 110 may receive an indication of one of the links (e.g., either the direct link 405 or the indirect link 410), and may transmit a communication to the UE 120 using only the indicated link. The indication may be transmitted by the UE 120 and/or the MS 305. In some examples, such selection and/or indication may be based at least in part on channel conditions and/or link reliability.

However, channel characteristics of the direct link 405 and the indirect link 410 may be different. For example, the direct link 405 and the indirect link 410 may be distinguishable in the spatial domain and/or the time domain. Additionally, or alternatively, the direct link 405 and the indirect link 410 may be associated with different Doppler characteristics (e.g., Doppler spread and/or Doppler shift). Therefore, the direct link 405 and the indirect link 410 may need to be separately maintained. For example, separate beam management (e.g., separate beam acquisition and/or beam tracking) may need to be performed for the direct link 405 and the indirect link 410. As another example, transmit and/or receive processing of signals associated with the direct link 405 and the indirect link 410 may be different due to different path delays and/or Doppler characteristics, and/or due to separate time and/or frequency synchronizations of the direct link 405 and the indirect link 410. Moreover, transmit power allocation for the direct link 405 and the indirect link 410 may be different due to different fading conditions of the direct link 405 and the indirect link 410. As a result, the direct link 405 and the indirect link 410 may be maintained simultaneously, but may need to be treated separately (e.g., by the base station 110 and/or the UE 120). Additionally, a wireless network may include multiple RISs 305, each of which may need to be separately maintained by the base station 110 and/or the UE 120. Further, each RIS 305 may be associated with multiple beam states and/or beam directions (e.g., as described in connection with FIG. 3), each of which may need to be maintained and/or identified by the base station 110 and/or the UE 120. However, the base station 110 and/or the UE 120 may be unable to differentiate between signals transmitted via the direct link 405 and the indirect link 410. Therefore, the base station 110 and/or the UE 120 may treat signals transmitted via the direct link 405 and the indirect link 410 the same, resulting in reduced communication performance and/or efficiency.

Some techniques and apparatuses described herein enable RIS link identification. For example, some techniques and apparatuses described herein enable a UE 120 and/or a base station 110 to differentiate between the direct link 405 and the indirect link 410 (e.g., the RIS link). For example, in some aspects, an RIS may be associated with a signature (e.g., an RIS signature). The RIS signature may be a unique sequence or pattern that identifies the RIS and/or a beam state or beam direction of the RIS. In some aspects, when the RIS redirects or reflects a signal, the RIS may transmit the RIS signature to identify that the signal has been transmitted via a link that includes the MS. For example, the RIS (or ab MS controller) may have some transmit capabilities (e.g., the MS and/or RIS controller may include an antenna, an antenna array, a transmit processor, and/or other RF front end hardware to enable the MS to transmit signals). Therefore, the RIS may be enabled to transmit an indication of the RIS signature (e.g., a sequence associated with the RIS signature) to indicate that the RIS has redirected or reflect a signal.

In some aspects, the RIS may transmit the indication of the RIS signature using time domain resources or frequency domain resources that are associated with the signal that is being redirected or reflected by the RIS. For example, the RIS may attenuate an amplitude of the signal or puncture the signal at given time domain resource locations and may transmit the indication of the indication of the RIS signature at the given time domain resource locations. As another example, the RIS may transmit the indication of the RIS signature by superposing the RIS signature over the signal in one or more time domain resources and/or frequency domain resources of the signal. Alternatively, the RIS may transmit the indication of the RIS signature using time domain resources or frequency domain resources that are not associated with the signal that is being redirected or reflected by the RIS. For example, the RIS may transmit the signal at the end of a signal burst or during a switching gap (e.g., an uplink to downlink switching gap or a downlink to uplink switching gap). As another example, the RIS may transmit the signal during time domain resources associated with a cyclic prefix of OFDM symbols of the signal. In some aspects, the RIS may transmit the indication of the RIS signature using frequency domain resource included in a guard band of a carrier bandwidth associated with the signal, using frequency domain resource included in a frequency outside of the carrier bandwidth, and/or using one or more frequency resources adjacent to the a set of frequency domain resources associated with the signal.

As a result, the transmitter and/or the receiver are enabled to identify and distinguish the direct link from the indirect link. For example, the receiver may receive the signal (e.g., that has been redirected or reflected by the RIS) and may receive the indication of the RIS signature. The receiver may identify that the signal has been redirected or reflected by the RIS based at least in part on receiving the indication of the RIS signature. Therefore, the transmitter and/or the receiver may simultaneously maintain the direct link and the indirect link, while also treating the direct link and the indirect link separately and/or differently. This may improve communication performance and efficiency by enabling the indirect link (e.g., associated with the RIS) to be associated with different beam management, communication processing, and/or transmit power allocation, among other examples, than the direct link (e.g., that is directly between the transmitter and the receiver).

As indicated above, FIG. 4 is provided as an example. Other examples may differ from what is described with respect to FIG. 4.

Figure 5:
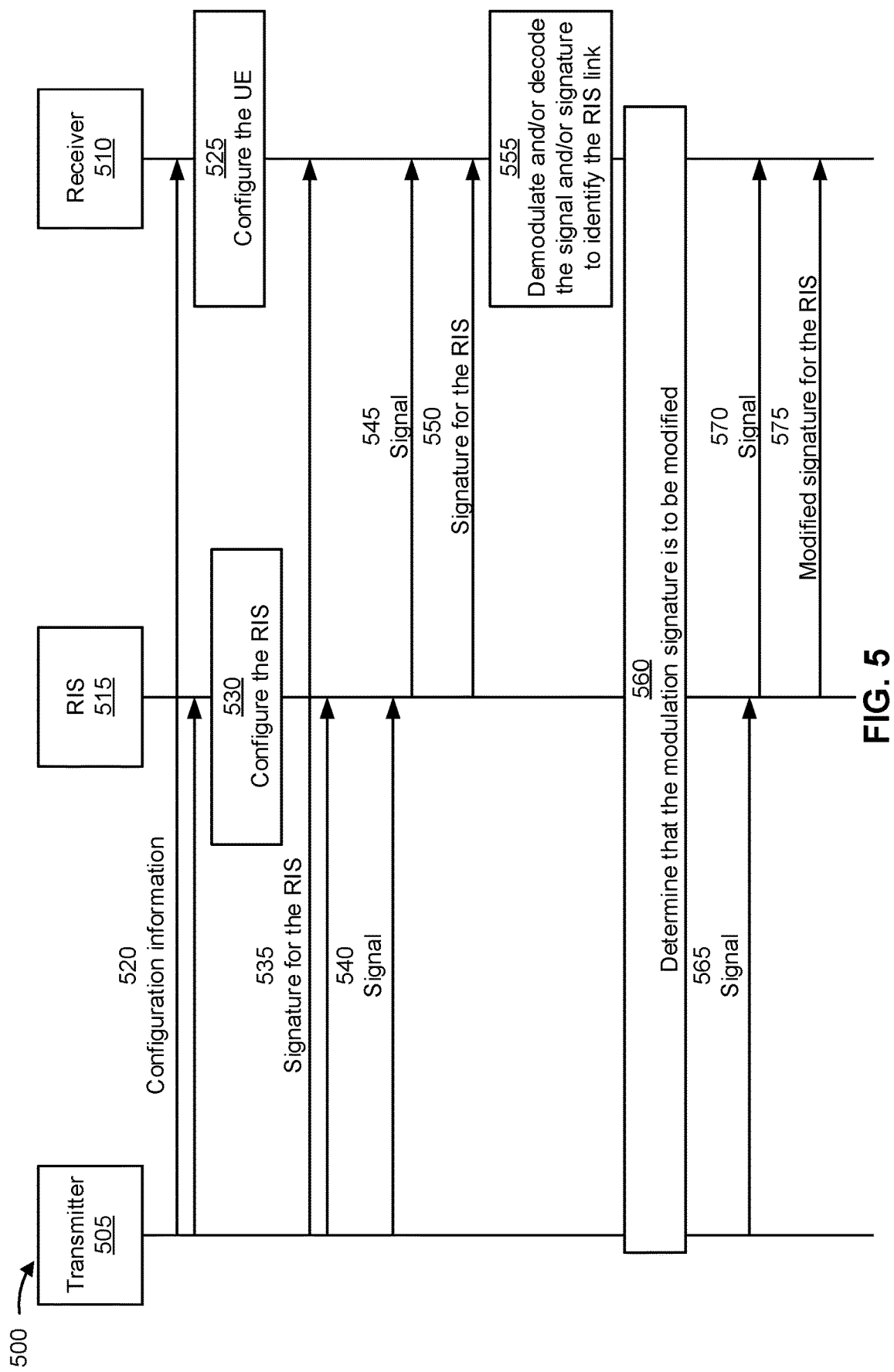
FIG. 5 is a diagram illustrating an example associated with MS link identification, in accordance with the present disclosure.

FIG. 5 is a diagram illustrating an example 500 associated with RIS link identification, in accordance with the present disclosure. As shown in FIG. 5, a transmitter 505 and a receiver 510 may communicate with one another in a wireless network, such as the wireless network 100. In some aspects, the transmitter 505 may be a base station 110 or a UE 120, among other examples. The receiver 510 may be a UE 120 or a base station 110, among other examples. As shown in FIG. 5, in some aspects, the transmitter 505 and the receiver 510 may communicate via an RIS 515. The RIS 515 may be similar to the RIS 305 described in connection with FIGS. 3 and 4.

As shown by reference number 520, the transmitter 505 may transmit, and the receiver 510 and/or the RIS 515 may receive, configuration information. In some aspects, the receiver 510 may receive configuration information from another device (e.g., from another base station or another UE). In some aspects, the receiver 510 may receive the configuration information via system information signaling, radio resource control (RRC) signaling and/or medium access control (MAC) signaling (e.g., MAC control elements (MAC-CEs)). In some aspects, the configuration information may include an indication of one or more configuration parameters (e.g., already known to the receiver 510) for selection by the receiver 510 and/or explicit configuration information for the receiver 510 to use to configure the receiver 510.

In some aspects, the configuration information may indicate that an indirect link between the transmitter 505, the RIS 515, and the receiver 510 is to be established and/or maintained. In some aspects, the configuration information may indicate an RIS signature associated with the RIS 515. The RIS signature may be a unique sequence and/or pattern associated with the RIS 515 that identifies the RIS 515. The RIS signature may also be referred to as an RIS watermark. In some aspects, the configuration information may indicate multiple RIS signatures associated with the RIS 515. For example, the configuration information may indicate an RIS signature for each beam state or beam direction associated with the RIS 515.

In some aspects, the configuration information may indicate that the MS 515 is to transmit an indication of the MS signature when the MS 515 redirects or reflects a signal, transmitted by the transmitter 505, to the receiver 510. In some aspects, the configuration information may indicate resources (e.g., time domain resources and/or frequency domain resources) that are to be used by the RIS 515 to transmit the indication of the RIS signature. For example, the configuration information may indicate that the RIS 515 is to use time domain resources and/or frequency domain resources, that are associated with signals reflected or redirected by the RIS 515, to transmit the indication of the RIS signature. The configuration information may indicate a pattern, periodicity, duration, and/or frequency of the transmission of the indication of the RIS signature (e.g., within the time domain resources and/or frequency domain resources that are associated with signals reflected or redirected by the RIS 515).

Alternatively, the configuration information may indicate that the RIS 515 is to use time domain resources and/or frequency domain resources that are not associated with signals reflected or redirected by the RIS 515. For example, the configuration information may indicate that the RIS 515 is to transmit the indication of the RIS signature at the end of signal bursts of signals reflected or redirected by the RIS 515 (e.g., downlink, uplink, or sidelink signal bursts) in the time domain. As another example, the configuration information may indicate that the RIS 515 is to transmit the indication of the RIS signature during time domain resources associated with a cyclic prefix of OFDM symbols of signals reflected or redirected by the RIS 515. In some aspects, the configuration information may indicate that the RIS 515 is to use frequency domain resources, to transmit the indication of the RIS signature, that are not included in frequency domain resources of signals reflected or redirected by the RIS 515. For example, the configuration information may indicate that the RIS 515 is to use frequency domain resources associated with a guard band of signals reflected or redirected by the RIS 515. As another example, the configuration information may indicate that the RIS 515 is to use frequency domain resources that are outside of a carrier or system bandwidth for signals reflected or redirected by the RIS 515. In some aspects, the configuration information may indicate that the RIS 515 is to use frequency domain resources adjacent to frequency domain resource allocations of signals reflected or redirected by the RIS 515.

In some aspects, the configuration information may indicate that the RIS signature and/or a pattern, periodicity, duration, and/or frequency of the transmission of the indication of the MS signature is to vary (e.g., dynamically) over time. For example, the configuration information may indicate that the MS signature and/or a pattern, periodicity, duration, and/or frequency of the transmission of the indication of the MS signature is to vary based at least in part on one or more communication parameters. The one or more communication parameters may include a signal type of signals reflected or redirected by the RIS 515, a modulation and coding scheme of signals reflected or redirected by the RIS 515, a time domain resource allocation of signals reflected or redirected by the RIS 515, a frequency domain resource allocation of signals reflected or redirected by the RIS 515, a Doppler spread of a channel, and/or a delay spread of the channel, among other examples.

As shown by reference number 525, the receiver 510 may configure the receiver 510 for communicating with the transmitter 505. In some aspects, the receiver 510 may configure the receiver 510 based at least in part on the configuration information. In some aspects, the receiver 510 may be configured to perform one or more operations described herein. As shown by reference number 530, the RIS 515 (and/or an RIS controller of the RIS 515) may configure the RIS 515 for communicating with the transmitter 505 and/or the receiver 510. In some aspects, the RIS 515 (and/or an RIS controller of the RIS 515) may configure the RIS 515 based at least in part on the configuration information. In some aspects, the RIS 515 may be configured to perform one or more operations described herein.

As shown by reference number 535, the transmitter 505 may transmit, and the receiver 510 and/or the RIS 515 may receive, an indication of the RIS signature of the RIS 515. For example, the transmitter 505 may transmit the indication of the RIS signature via the configuration information, as described elsewhere herein. Alternatively, the transmitter 505 may transmit the indication of the RIS signature via another message, such as a scheduling grant or downlink control information. For example, the transmitter 505 may transmit an indication of the sequence associated the RIS signature via at least one of a system information message (e.g., a system information block (SIB) message), an RRC message, a MAC-CE message, and/or a downlink control information message, among other examples.

In some aspects, the indication of the RIS signature may be transmitted by another device, such as a control node (e.g., a base station 110 or another network control device). In some aspects, the transmitter 505 may transmit (e.g., to the RIS 515 and/or the receiver 510) a scheme to be used by the MS 515 to transmit an indication of the MS signature. For example, in some aspects, the transmitter 505 may indicate that the MS 515 is to use an invasive scheme where the RIS 515 uses time domain resources and/or frequency domain resources associated with signals to be redirected or reflected by the MS 515 to transmit the indication of the MS signature. Alternatively, the transmitter 505 may indicate that the RIS 515 is to use a non-invasive scheme where the RIS 515 does not use time domain resources and/or frequency domain resources associated with signals to be redirected or reflected by the RIS 515 to transmit the indication of the RIS signature.

In some aspects, the transmitter 505 may transmit an indication of a pattern, a periodicity, a duration, and/or a frequency of the transmission of the indication of the RIS signature. For example, the RIS 515 may transmit the indication of the RIS signature in accordance with a pattern, periodicity, a duration, and/or a frequency (e.g., a number of transmission occurrences of the RIS signature within time domain resources of signals to be redirected or reflected by the RIS 515).

As shown by reference number 540, the transmitter 505 may transmit a signal. The signal may be a downlink signal, an uplink signal, or a sidelink signal. The signal may include a set of symbols in the time domain (e.g., a set of OFDM symbols). In some aspects, the transmitter 505 may transmit the signal in a spatial direction towards the RIS 515. The signal may be reflected or redirected by the RIS 515 to the receiver 510. For example, as shown by reference number 545, the RIS 515 may reflect or redirect the signal in a spatial direction toward the receiver 510. The receiver 510 may receive the signal that has been reflected or redirected by the RIS 515.

As shown by reference number 550, the RIS 515 may transmit, and the receiver 510 may receive, an indication of the RIS signature associated with the RIS 515. For example, the RIS 515 may transmit, and the receiver 510 may receive, a sequence associated with the signature of the RIS (e.g., the RIS signature) indicating that the signal is transmitted using a link associated with the RIS 515.

As described elsewhere herein, the RIS 515 may use time domain resource and/or frequency domain resources that are associated with (e.g., used by) the signal to transmit the sequence associated with the RIS signature. This may conserve resources associated with transmitting the indication of the RIS signature because additional time domain resources and/or frequency domain resources may not be required to transmit the indication of the RIS signature. For example, the RIS 515 may attenuate the amplitude of the signal (e.g., to be reflected or redirected by the RIS 515). In some aspects, the MS 515 may attenuate the amplitude of the signal in accordance with a pattern, a periodicity, and/or a duration, among other examples (e.g., as indicated by the transmitter 505 and/or the configuration information). For example, at certain time intervals, the MS 515 may attenuate the amplitude by turning off one or more reconfigurable elements (e.g., such that the reconfigurable elements that are turned off do not reflect or redirect the signal). For example, one or more reconfigurable elements of the RIS 515 may be tuned with a random phase to change a reflection angle (e.g., a beam direction) of the signal (e.g., the RIS 515 may point a beam direction to a null direction (e.g., towards the sky) to increase the attenuation of the signal).

In some aspects, the RIS 515 attenuates the amplitude of the signal by puncturing (e.g., not reflect or redirect) the signal at certain time intervals. For example, the signal, as received by the receiver 510, may be modulated (e.g., by the RIS 515) with attenuation in the amplitude of the signal (e.g., where with amplitude is reduced) or with gaps (e.g., where the amplitude is zero) where no signal is received by the receiver 510. In other words, the receiver 510 may receive the signal that includes one or more time domain resources with an attenuated amplitude of the signal. The RIS 515 may use the one or more time domain resources with the attenuated amplitude to transmit the indication of the RIS signature (e.g., to transmit the sequence associated with the RIS signature). For example, the signal, as received by the receiver 510, may include the sequence associated with the RIS signature in the time domain resources with an attenuated amplitude of the signal. In other words, the RIS signature (e.g., the sequence associated with the RIS signature) may be inserted into the signal that is redirected or reflected by the RIS 515.

In some aspects, the RIS 515 may not modulate or modify the signal that is redirected or reflected by the RIS 515 (e.g., the RIS 515 may not attenuate the amplitude of the signal). Rather, the RIS 515 may transmit the indication of the RIS signature superposed or superimposed over the signal that is redirected or reflected by the RIS 515. For example, the RIS 515 may transmit the indication of the RIS signature superposed or superimposed over the signal in one or more time domain resources (e.g., in one or more OFDM symbols) associated with the signal. Additionally, or alternatively, the RIS 515 may transmit the indication of the RIS signature superposed or superimposed over the signal in one or more frequency domain resources (e.g., in one or more resource elements or tones) associated with the signal. For example, the RIS 515 may insert the sequence associated with the RIS signature in one or more time domain resources and/or one or more frequency domain resources of the signal (e.g., without modifying, attenuating, and/or puncturing the signal). Therefore, the receiver 510 may receive the sequence associated with the RIS signature in one or more time domain resources of a time domain resource allocation for the signal and/or in one or more frequency domain resources of a frequency domain resource allocation for the signal.

Alternatively, the RIS 515 may use a non-invasive scheme where the indication of the RIS signature uses time domain resources and/or frequency domain resources that are outside of a resource allocation for the signal that is reflected and/or redirected by the RIS 515. For example, the RIS 515 may transmit the sequence associated with the RIS signature without modifying the signal, without attenuating the amplitude of the signal, and/or without superimposing the RIS signature on top of the signal. This may improve communication performance as the signal that is redirected or reflected by the RIS 515 is not modified or degraded by the RIS 515 transmitting the indication of the RIS signature. For example, in some aspects, the signal may be transmitted in a signal burst. The RIS 515 may append the sequence associated with the RIS signature after time domain resources associated with the signal burst. For example, the RIS 515 may append the sequence associated with the RIS signature at the end of the signal burst associated with the signal. In other words, the signal may use a first set of time domain resources (e.g., a signal burst). The RIS 515 may transmit, and the receiver 510 may receive, the sequence associated with RIS signature in a second set of time domain resources (e.g., located after or before the first set of time domain resources).

In some aspects, the receiver 510 and/or the RIS 515 may be configured (e.g., by the transmitter 505 and/or the configuration information) with one or more switching gaps. A switching gap may be an amount of time during which no communications are scheduled. The switching gap may be used by the receiver 510 and/or the transmitter 505 to switch from downlink communications to uplink communications, or vice versa (e.g., RF front end hardware of the transmitter 505 and/or the receiver 510 may require some amount of time to switch from transmitting or receiving downlink communications to transmitting or receiving uplink communications). The RIS 515 may transmit, and the receiver 510 may receive, the sequence associated with RIS signature using time domain resource(s) associated with a switching gap (e.g., in an uplink to downlink switching gap or a downlink to uplink switching gap).

In some aspects, the signal may be transmitted using a slot structure where OFDM symbols in the slot structure include a cyclic prefix. In some aspects, a long cyclic prefix may occur once over 0.5 milliseconds. For example, other than the first OFDM symbol every 0.5 milliseconds, each cyclic prefix may have the same duration. The first OFDM symbol every 0.5 milliseconds may have a longer duration than the other cyclic prefixes associated with the slot structure. The 0.5 milliseconds may correspond to half of a slot, 1 slot, 2 slot, 4 slots, and/or other number of slots, depending on a subcarrier spacing used for the signal. Similarly, the duration of the cyclic prefix (e.g., the long cyclic prefix and/or the shorter cyclic prefix) may depend on the subcarrier spacing used for the signal. In some aspects, the RIS 515 may transmit the indication of the RIS signature (e.g., the sequence associated with the RIS signature) in time domain resources that are located in a cyclic prefix of an OFDM symbol associated with the signal. For example, the RIS 515 may attenuate the amplitude of the signal or may puncture the signal during time domain resources associated with the cyclic prefix. The RIS 515 may transmit the indication of the RIS signature using the attenuated or puncture time domain resources associated with the cyclic prefix. In some aspects, the RIS 515 may not modify, attenuate, or puncture the signal during the time domain resources associated with the cyclic prefix. Instead, the RIS 515 may insert or superimpose the indication of the RIS signature in one or more time domain resources associated with the cyclic prefix. In some aspects, the cyclic prefix may be the long cyclic prefix (e.g., that occurs every 0.5 milliseconds or some other period of time).

In some aspects, the non-invasive scheme may be associated with transmitting the indication of the RIS signature using frequency domain resources that are not associated with, or included in, a frequency domain resource allocation of the signal. For example, the receiver 510 may receive the signal using a first set of frequency domain resources. The receiver 510 may receive the sequence associated with the RIS signature in a second set of frequency domain resources. The second set of frequency domain resources may be included in a guard band of a carrier bandwidth or a system bandwidth associated with the signal. For example, in some aspects, a guard band may be configured at the bounds of a carrier bandwidth or a system bandwidth. The guard band may be a set of frequency domain resources (e.g., a set of resource elements or tones) in which no signals are transmitted. The guard band may be used to mitigate inter-carrier interference or other interference within the wireless network. As another example, the second set of frequency domain resources may be included in one or more frequency domain resources outside of the carrier bandwidth or the system bandwidth. For example, the MS 515 may transmit the indication of the MS signature using one or more tones or resource elements that are outside of the carrier bandwidth or the system bandwidth associated with the signal. As another example, the second set of frequency domain resources may be included in one or more frequency domain resources adjacent to the first set of frequency domain resources (e.g., to the frequency domain resource allocation of the signal). For example, the RIS 515 may insert the sequence associated with the RIS signature in one or more tones or resource elements that are near, or adjacent to, the frequency domain resource allocation of the signal that is redirected or reflected by the RIS 515.

As shown by reference number 555, the receiver 510 may demodulate and/or decode the signal and/or the indication of the RIS signature. For example, the receiver 510 may receive the signal that is redirected or reflected by the RIS 515 and may receive the indication of the RIS signature. As explained elsewhere herein, the indication of the RIS signature may be included in, or embedded in, the signal that is redirected or reflected by the RIS 515. Alternatively, the indication of the RIS signature may be included in resources (e.g., time domain resources and/or frequency domain resources) that are separate from the time domain resource allocation and/or the frequency domain resource allocation associated with the signal. The receiver 510 may identify the indication of the RIS signature (e.g., may identify or detect the sequence associated with the RIS signature) to identify that the signal was transmitted via a link that includes the RIS 515. For example, the receiver 510 may demodulate and/or decode signal(s) received by the receiver 510 to detect the sequence associated with the RIS signature. Based at least in part on detecting the sequence associated with the RIS signature, the receiver 510 may detect that a received signal (e.g., that was transmitted by the transmitter 505) was redirected or reflected by the RIS 515.

In some aspects, the receiver 510 may identify a beam direction and/or a beam state associated with the signal based at least in part on detecting the indication of the RIS signature. For example, in some aspects, the RIS 515 may redirect or reflect signals to the receiver 510 using different beam states or beam directions (e.g., with each beam state or beam direction being associated with a different RIS signature). The receiver 510 may receive and/or measure the signals to identify a best beam state or beam direction of the RIS 515 for the receiver 510 (e.g., to identify a signal with a highest measurement value to identify a best serving beam state of the RIS 515 for the receiver 510). The receiver 510 may be enabled to differentiate between the beam states or beam directions of the RIS 515 using the different RIS signatures used by the MS 515.

As shown by reference number 560, in some aspects, the transmitter 505, the receiver 510, and/or the RIS 515 may determine that the RIS signature of the RIS 515 is to be modified. For example, to mitigate communication performance degradation as communication conditions change, the RIS signature of the RIS 515 may be dynamically changed based at least in part on one or more communication parameters. The one or more communication parameters may include a signal type (e.g., control signal type, data signal type, and/or pilot signal type) of a new signal (e.g., to be redirected or reflected by the RIS 515), a modulation and coding scheme, a time domain resource allocation, a frequency domain resource allocation, a Doppler spread, and/or a delay spread, among other examples. In some aspects, the RIS 515 may determine a modified RIS signature (e.g., a new RIS signature or a new sequence associated with the RIS signature) associated with the RIS 515 and/or may determine that the RIS signature should be changed (e.g., based at least in part on the one or more communication parameters). In some other aspects, the transmitter 505 may determine a modified RIS signature associated with the RIS 515 (e.g., based at least in part on the one or more communication parameters). The transmitter 505 may transmit, and the RIS 515 and/or the receiver 510 may receive, an indication of the modified RIS signature or a request to modify the RIS signature. In some other aspects, the receiver 510 may determine a modified RIS signature associated with the RIS 515 and/or may determine that the RIS signature should be changed (e.g., based at least in part on the one or more communication parameters). The receiver 510 may transmit, and the RIS 515 and/or the transmitter 505 may receive, an indication of the modified RIS signature or a request to modify the RIS signature.

As shown by reference number 565, the transmitter 505 may transmit a new signal (e.g., in a spatial direction towards the RIS 515). As shown by reference number 570, the RIS 515 may redirect or reflect the new signal in a spatial direction towards the receiver 510 (e.g., in a similar manner as described elsewhere herein). As shown by reference number 575, the RIS 515 may transmit an indication of the modified RIS signature. The receiver 510 may receive the new signal and/or the indication of the modified MS signature. In some aspects, the receiver 510 may decode the new signal by performing hypothesis testing of one or more candidate MS signatures (or one or more candidate sequences associated with the MS signature) to identify the modified MS signature. For example, the receiver 510 may not receive an indication of the modified MS signature (e.g., as the MS signature may be dynamically changed).

Therefore, the receiver 510 may need to perform blind detection of the modified RIS signature using one or more candidate RIS signatures as hypothesis. For example, the one or more candidate RIS signatures may be indicated to the receiver 510 via the configuration information or another message.

As a result, the transmitter 505 and/or the receiver 510 may be enabled to identify and distinguish a direct link from an indirect link that is associated with the RIS 515. Therefore, the transmitter 505 and/or the receiver 510 may simultaneously maintain the direct link and the indirect link, while also treating the direct link and the indirect link separately and/or differently. This may improve communication performance and efficiency by enabling the indirect link (e.g., associated with the RIS 515) to be associated with different beam management, communication processing, and/or transmit power allocation, among other examples, than the direct link (e.g., that is directly between the transmitter 505 and the receiver 510).

As indicated above, FIG. 5 is provided as an example. Other examples may differ from what is described with respect to FIG. 5.

FIG. 6 is a diagram illustrating an example process 600 performed, for example, by a receiver, in accordance with the present disclosure. Example process 600 is an example where the receiver (e.g., the receiver 510, a UE 120, or a base station 110) performs operations associated with RIS link identification.

As shown in FIG. 6, in some aspects, process 600 may include receiving, from a transmitter, an indication of a signature of an RIS (block 610). For example, the receiver (e.g., using communication manager 140 and/or reception component 902, depicted in FIG. 9) may receive, from a transmitter, an indication of a signature of an RIS, as described above.

As further shown in FIG. 6, in some aspects, process 600 may include receiving a signal that is transmitted by the transmitter and redirected by the RIS (block 620). For example, the receiver (e.g., using communication manager 140 and/or reception component 902, depicted in FIG. 9) may receive a signal that is transmitted by the transmitter and redirected by the RIS, as described above.

As further shown in FIG. 6, in some aspects, process 600 may include receiving, from the RIS, a sequence associated with the signature of the RIS indicating that the signal is transmitted using a link associated with the RIS (block 630). For example, the receiver (e.g., using communication manager 140 and/or reception component 902, depicted in FIG. 9) may receive, from the RIS, a sequence associated with the signature of the RIS indicating that the signal is transmitted using a link associated with the RIS, as described above.

Process 600 may include additional aspects, such as any single aspect or any combination of aspects described below and/or in connection with one or more other processes described elsewhere herein.

In a first aspect, the sequence uses time domain resources or frequency domain resources that are associated with the signal.

In a second aspect, alone or in combination with the first aspect, the sequence uses time domain resources or frequency domain resources that are not associated with the signal.

In a third aspect, alone or in combination with one or more of the first and second aspects, receiving the signal includes receiving the signal that includes one or more time domain resources with an attenuated amplitude, and receiving the sequence associated with the signature of the RIS includes receiving the sequence associated with the signature of the RIS in the one or more time domain resources.

In a fourth aspect, alone or in combination with one or more of the first through third aspects, receiving the sequence associated with the signature of the RIS includes receiving the sequence associated with the signature of the RIS in one or more time domain resources associated with the signal, where the signal is superposed by the sequence in the one or more time domain resources.

In a fifth aspect, alone or in combination with one or more of the first through fourth aspects, receiving the sequence associated with the signature of the RIS includes receiving the sequence in one or more time domain resources of a time domain resource allocation for the signal.

In a sixth aspect, alone or in combination with one or more of the first through fifth aspects, receiving the sequence associated with the signature of the RIS includes receiving the sequence in one or more frequency domain resources of a frequency domain resource allocation for the signal.

In a seventh aspect, alone or in combination with one or more of the first through sixth aspects, receiving the signal includes receiving a signal burst including a first set of time domain resources, and receiving the sequence associated with the signature of the MS includes receiving the sequence in a second set of time domain resources.

In an eighth aspect, alone or in combination with one or more of the first through seventh aspects, the second set of time domain resources are located after the first set of time domain resources or in an uplink to downlink switching gap or a downlink to uplink switching gap.

In a ninth aspect, alone or in combination with one or more of the first through eighth aspects, the second set of time domain resources are located in a cyclic prefix of an orthogonal frequency division multiplexing symbol associated with the signal.

In a tenth aspect, alone or in combination with one or more of the first through ninth aspects, receiving the signal includes receiving the signal in a first set of frequency domain resources, and receiving the sequence associated with the signature of the RIS includes receiving the sequence in a second set of frequency domain resources.

In an eleventh aspect, alone or in combination with one or more of the first through tenth aspects, the second set of frequency domain resources are included in at least one of a guard band of a carrier bandwidth, one or more frequency domain resources outside of the carrier bandwidth, or one or more frequency domain resources adjacent to the first set of frequency domain resources.

In a twelfth aspect, alone or in combination with one or more of the first through eleventh aspects, receiving the indication of the signature of the RIS includes receiving an indication of the sequence associated the signature via at least one of a radio resource control message, a MAC-CE message, or a downlink control information message.

In a thirteenth aspect, alone or in combination with one or more of the first through twelfth aspects, the sequence associated with the signature of the RIS identifies the RIS and a beam state associated with the RIS.

In a fourteenth aspect, alone or in combination with one or more of the first through thirteenth aspects, process 600 includes receiving, from the RIS, a new sequence associated with the signature of the RIS, the new sequence identifies the RIS, and the new sequence is based at least in part on a communication parameter.

In a fifteenth aspect, alone or in combination with one or more of the first through fourteenth aspects, the communication parameter includes at least one of a signal type of the signal, a modulation and coding scheme, a time domain resource allocation of the signal, a frequency domain resource allocation of the signal, a Doppler spread, or a delay spread.

In a sixteenth aspect, alone or in combination with one or more of the first through fifteenth aspects, receiving the new sequence associated with the signature of the RIS includes decoding the new sequence using one or more candidate sequences to identify the new sequence.

In a seventeenth aspect, alone or in combination with one or more of the first through sixteenth aspects, process 600 includes transmitting, to at least one of the transmitter or the RIS, a request to modify the sequence or the signature associated with the RIS.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

FIG. 7 is a diagram illustrating an example process 700 performed, for example, by a transmitter, in accordance with the present disclosure. Example process 700 is an example where the transmitter (e.g., the transmitter 505, a UE 120, or a base station 110) performs operations associated with RIS link identification.

As shown in FIG. 7, in some aspects, process 700 may include transmitting, to at least one of a receiver or an RIS, an indication of a signature of the RIS (block 710). For example, the transmitter (e.g., using communication manager 150 and/or transmission component 1004, depicted in FIG. 10) may transmit, to at least one of a receiver or an RIS, an indication of a signature of the RIS, as described above.

As further shown in FIG. 7, in some aspects, process 700 may include transmitting a signal that is to be redirected to the receiver by the RIS using a link that is identified by a sequence associated with the signature of the RIS (block 720). For example, the transmitter (e.g., using communication manager 150 and/or transmission component 1004, depicted in FIG. 10) may transmit a signal that is to be redirected to the receiver by the RIS using a link that is identified by a sequence associated with the signature of the RIS, as described above.

Process 700 may include additional aspects, such as any single aspect or any combination of aspects described below and/or in connection with one or more other processes described elsewhere herein.

In a first aspect, the sequence uses time domain resources or frequency domain resources that are associated with the signal.

In a second aspect, alone or in combination with the first aspect, the sequence uses time domain resources or frequency domain resources that are not associated with the signal.

In a third aspect, alone or in combination with one or more of the first and second aspects, transmitting the indication of the signature of the RIS includes transmitting an indication of the sequence associated the signature via at least one of a radio resource control message, a MAC-CE message, or a downlink control information message.

In a fourth aspect, alone or in combination with one or more of the first through third aspects, the sequence associated with the signature of the RIS identifies the RIS and a beam state associated with the RIS.

In a fifth aspect, alone or in combination with one or more of the first through fourth aspects, process 700 includes transmitting a new signal that is to be redirected to the receiver by the RIS using the link that is identified by a new sequence associated with the signature of the RIS, where the new sequence identifies the RIS, and the new sequence is based at least in part on a communication parameter.

In a sixth aspect, alone or in combination with one or more of the first through fifth aspects, the communication parameter includes at least one of a signal type of the signal, a modulation and coding scheme, a time domain resource allocation of the signal, a frequency domain resource allocation of the signal, a Doppler spread, or a delay spread.

In a seventh aspect, alone or in combination with one or more of the first through sixth aspects, process 700 includes transmitting, to at least one of the receiver or the RIS, a request to modify the sequence or the signature associated with the RIS.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

FIG. 8 is a diagram illustrating an example process 800 performed, for example, by an RIS, in accordance with the present disclosure. Example process 800 is an example where the RIS (e.g., the RIS 515 or the RIS 305) performs operations associated with MS link identification.

As shown in FIG. 8, in some aspects, process 800 may include receiving, from a transmitter, an indication of a signature of the MS (block 810). For example, the RIS (e.g., using communication manager 170 and/or reception component 1102, depicted in FIG. 11) may receive, from a transmitter, an indication of a signature of the RIS, as described above.

As further shown in FIG. 8, in some aspects, process 800 may include receiving and redirecting a signal, that is transmitted by the transmitter, to a receiver (block 820). For example, the RIS (e.g., using communication manager 170, reception component 1102, and/or redirection component 1108, depicted in FIG. 11) may receive and redirect a signal that, is transmitted by the transmitter, to a receiver, as described above.

As further shown in FIG. 8, in some aspects, process 800 may include transmitting, to the receiver, a sequence associated with the signature of the RIS indicating that the signal is transmitted using a link associated with the RIS (block 830). For example, the RIS (e.g., using communication manager 170 and/or transmission component 1104, depicted in FIG. 11) may transmit, to the receiver, a sequence associated with the signature of the RIS indicating that the signal is transmitted using a link associated with the RIS, as described above.

Process 800 may include additional aspects, such as any single aspect or any combination of aspects described below and/or in connection with one or more other processes described elsewhere herein.

In a first aspect, the sequence uses time domain resources or frequency domain resources that are associated with the signal.

In a second aspect, alone or in combination with the first aspect, the sequence uses time domain resources or frequency domain resources that are not associated with the signal.

In a third aspect, alone or in combination with one or more of the first and second aspects, receiving and redirecting the signal includes receiving, from the transmitter, the signal, modifying an amplitude for one or more time domain resources of the signal by attenuating the amplitude of the signal in the one or more time domain resources, and redirecting the signal that uses one or more time domain resources with an attenuated amplitude, and transmitting the sequence associated with the signature of the MS includes transmitting the sequence associated with the signature of the MS in the one or more time domain resources.

In a fourth aspect, alone or in combination with one or more of the first through third aspects, transmitting the sequence associated with the signature of the MS includes transmitting the sequence associated with the signature of the RIS in one or more time domain resources associated with the signal, where the signal is superposed by the sequence in the one or more time domain resources.

In a fifth aspect, alone or in combination with one or more of the first through fourth aspects, transmitting the sequence associated with the signature of the RIS includes transmitting the sequence in one or more time domain resources of a time domain resource allocation for the signal.

In a sixth aspect, alone or in combination with one or more of the first through fifth aspects, transmitting the sequence associated with the signature of the RIS includes transmitting the sequence in one or more frequency domain resources of a frequency domain resource allocation for the signal.

In a seventh aspect, alone or in combination with one or more of the first through sixth aspects, receiving and redirecting the signal includes receiving a signal burst including a first set of time domain resources, and transmitting the sequence associated with the signature of the RIS includes transmitting the sequence in a second set of time domain resources.

In an eighth aspect, alone or in combination with one or more of the first through seventh aspects, the second set of time domain resources are located after the first set of time domain resources or in an uplink to downlink switching gap or a downlink to uplink switching gap.

In a ninth aspect, alone or in combination with one or more of the first through eighth aspects, the second set of time domain resources are located in a cyclic prefix of an orthogonal frequency division multiplexing symbol associated with the signal.

In a tenth aspect, alone or in combination with one or more of the first through ninth aspects, receiving and redirecting the signal includes receiving the signal in a first set of frequency domain resources, and transmitting the sequence associated with the signature of the RIS includes transmitting the sequence in a second set of frequency domain resources.

In an eleventh aspect, alone or in combination with one or more of the first through tenth aspects, the second set of frequency domain resources are included in at least one of a guard band of a carrier bandwidth, one or more frequency domain resources outside of the carrier bandwidth, or one or more frequency domain resources adjacent to the first set of frequency domain resources.

In a twelfth aspect, alone or in combination with one or more of the first through eleventh aspects, receiving the indication of the signature of the RIS includes receiving an indication of the sequence associated the signature via at least one of a radio resource control message, a MAC-CE message, or a downlink control information message.

In a thirteenth aspect, alone or in combination with one or more of the first through twelfth aspects, the sequence associated with the signature of the RIS identifies the RIS and a beam state associated with the RIS.

In a fourteenth aspect, alone or in combination with one or more of the first through thirteenth aspects, process 800 includes transmitting, to the receiver, a new sequence associated with the signature of the RIS, where the new sequence identifies the RIS, and the new sequence is based at least in part on a communication parameter.

In a fifteenth aspect, alone or in combination with one or more of the first through fourteenth aspects, the communication parameter includes at least one of a signal type of the signal, a modulation and coding scheme, a time domain resource allocation of the signal, a frequency domain resource allocation of the signal, a Doppler spread, or a delay spread.

In a sixteenth aspect, alone or in combination with one or more of the first through fifteenth aspects, process 800 includes receiving, from at least one of the transmitter or the receiver, a request to modify the sequence or the signature associated with the RIS.

In a seventeenth aspect, alone or in combination with one or more of the first through sixteenth aspects, process 800 includes determining to modify the sequence to the new sequence based at least in part on the communication parameter.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
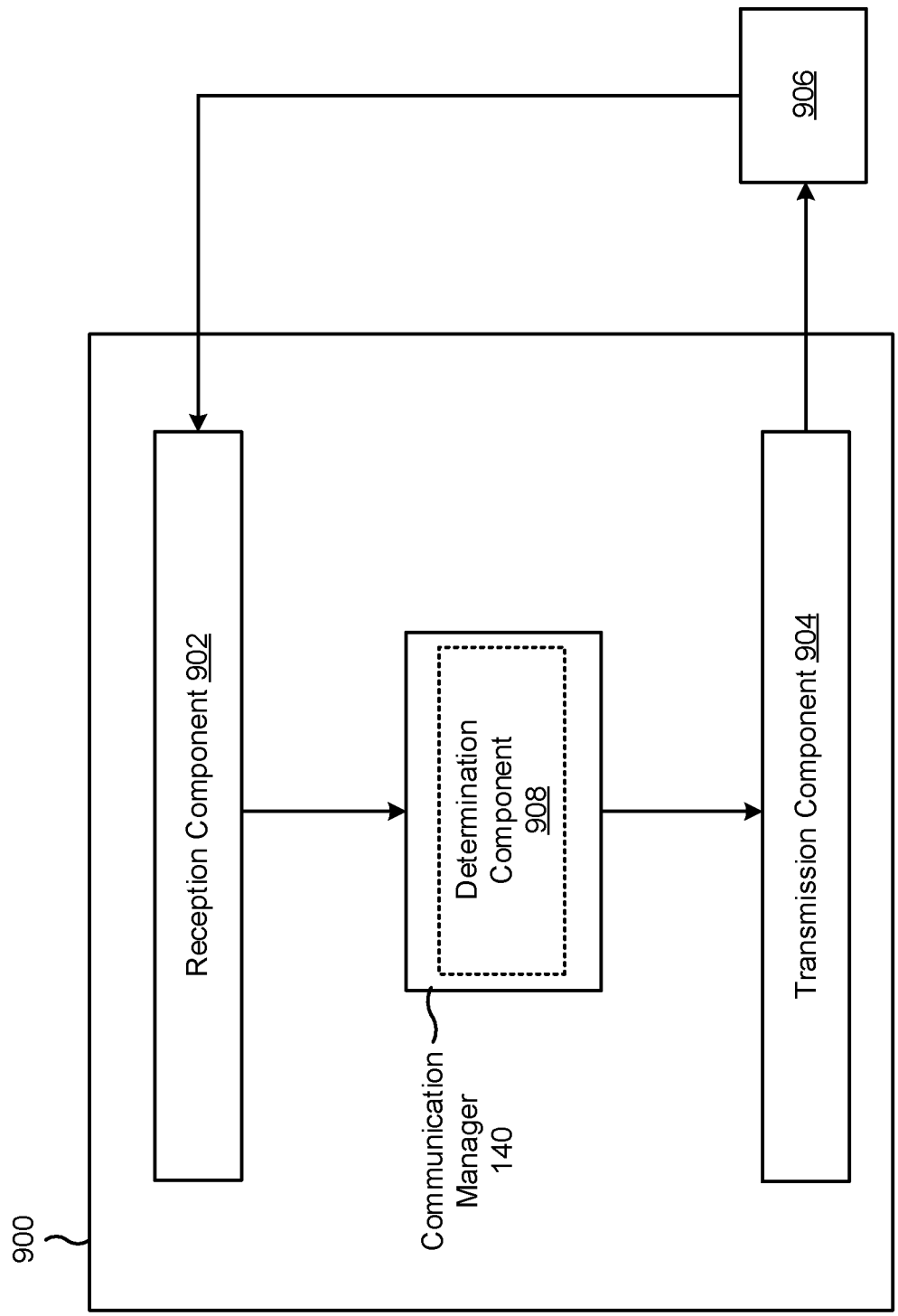
FIGS. 9-11 are diagrams of example apparatuses for wireless communication, in accordance with the present disclosure.

FIG. 9 is a diagram of an example apparatus 900 for wireless communication. The apparatus 900 may be a receiver, or a receiver may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 140. The communication manager 140 may include a determination component 908, among other examples.

In some aspects, the apparatus 900 may be configured to perform one or more operations described herein in connection with FIG. 5. Additionally, or alternatively, the apparatus 900 may be configured to perform one or more processes described herein, such as process 600 of FIG. 6, or a combination thereof. In some aspects, the apparatus 900 and/or one or more components shown in FIG. 9 may include one or more components of the receiver described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a modem, a demodulator, a MIMO detector, a receive processor, a controller/processor, a memory, or a combination thereof, of the receiver described in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the receiver described in connection with FIG. 2. In some aspects, the transmission component 904 may be co-located with the reception component 902 in a transceiver.

The reception component 902 may receive, from a transmitter, an indication of a signature of an RIS. The reception component 902 may receive a signal that is transmitted by the transmitter and redirected by the RIS. The reception component 902 may receive, from the RIS, a sequence associated with the signature of the RIS indicating that the signal is transmitted using a link associated with the RIS.

The determination component 908 may determine that the link is associated with the RIS based at least in part on receiving the sequence associated with the signature of the RIS.

The reception component 902 may receive, from the RIS, a new sequence associated with the signature of the RIS, the new sequence identifies the RIS, and the new sequence is based at least in part on a communication parameter.

The transmission component 904 may transmit, to at least one of the transmitter or the RIS, a request to modify the sequence or the signature associated with the RIS.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
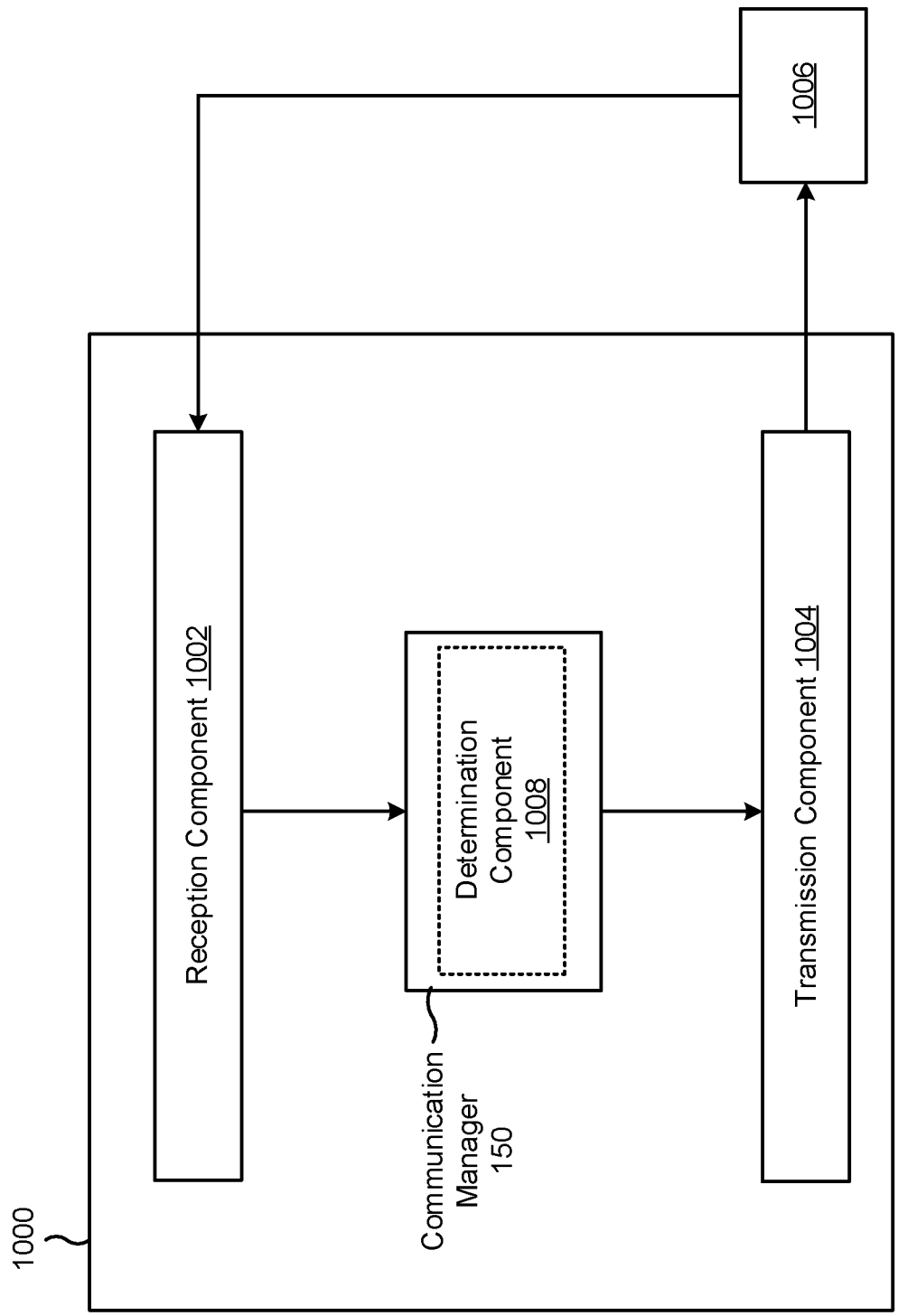

FIG. 10 is a diagram of an example apparatus 1000 for wireless communication. The apparatus 1000 may be a transmitter, or a transmitter may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 150. The communication manager 150 may include a determination component 1008, among other examples.

In some aspects, the apparatus 1000 may be configured to perform one or more operations described herein in connection with FIG. 5. Additionally, or alternatively, the apparatus 1000 may be configured to perform one or more processes described herein, such as process 700 of FIG. 7, or a combination thereof. In some aspects, the apparatus 1000 and/or one or more components shown in FIG. 10 may include one or more components of the transmitter described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a modem, a demodulator, a MIMO detector, a receive processor, a controller/processor, a memory, or a combination thereof, of the transmitter described in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the transmitter described in connection with FIG. 2. In some aspects, the transmission component 1004 may be co-located with the reception component 1002 in a transceiver.

The transmission component 1004 may transmit, to at least one of a receiver or an RIS, an indication of a signature of the RIS. The transmission component 1004 may transmit a signal that is to be redirected to the receiver by the RIS using a link that is identified by a sequence associated with the signature of the RIS.

The determination component 1008 may determine the signature of the RIS or a sequence associated with the signature of the RIS.

The transmission component 1004 may transmit a new signal that is to be redirected to the receiver by the RIS using the link that is identified by a new sequence associated with the signature of the RIS, the new sequence identifies the RIS, and the new sequence is based at least in part on a communication parameter. The determination component 1008 may determine the new sequence.

The transmission component 1004 may transmit, to at least one of the receiver or the RIS, a request to modify the sequence or the signature associated with the RIS.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
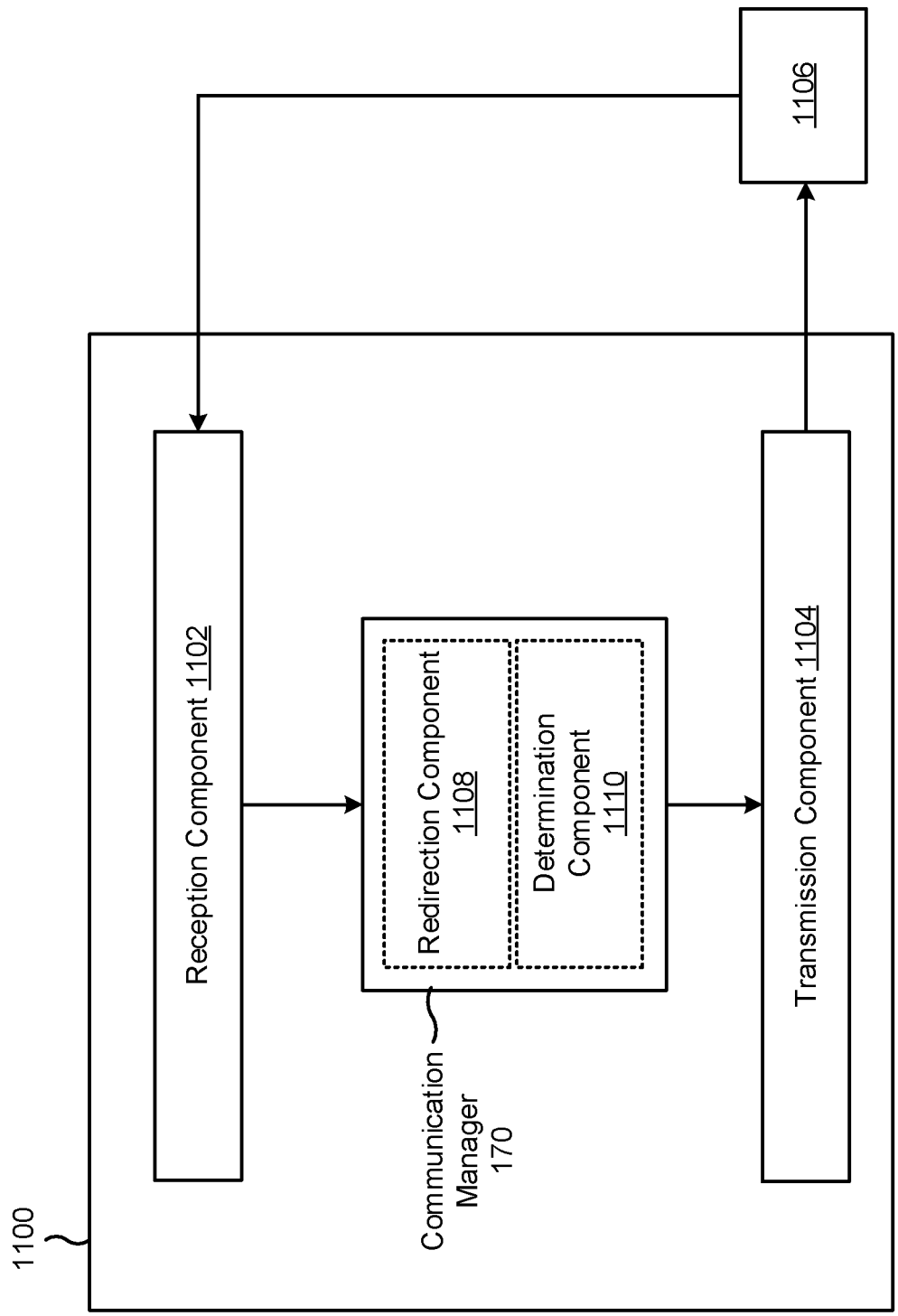

FIG. 11 is a diagram of an example apparatus 1100 for wireless communication. The apparatus 1100 may be an RIS, or an RIS may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 170. The communication manager 170 may include one or more of a redirection component 1108, and/or a determination component 1110, among other examples.

In some aspects, the apparatus 1100 may be configured to perform one or more operations described herein in connection with FIG. 5. Additionally, or alternatively, the apparatus 1100 may be configured to perform one or more processes described herein, such as process 800 of FIG. 8, or a combination thereof. In some aspects, the apparatus 1100 and/or one or more components shown in FIG. 11 may include one or more components of the RIS described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1106. In some aspects, the reception component 1102 may include one or more antennas, a modem, a demodulator, a MIMO detector, a receive processor, a controller/processor, a memory, or a combination thereof, of the RIS described in connection with FIGS. 1 and 2. In some aspects, the reception component 1102 may include one or more reconfigurable elements capable of reflecting or redirecting impinging signals.

The transmission component 1104 may transmit communications, such as reference signals, control information, data communications, or a combination thereof, to the apparatus 1106. In some aspects, one or more other components of the apparatus 1106 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the RIS described in connection with FIGS. 1 and 2. In some aspects, the transmission component 1104 may be co-located with the reception component 1102 in a transceiver.

The reception component 1102 may receive, from a transmitter, an indication of a signature of the RIS. The reception component 1102 and/or the redirection component 1108 may receive and redirect a signal, that is transmitted by the transmitter, to a receiver. The transmission component 1104 may transmit, to the receiver, a sequence associated with the signature of the RIS indicating that the signal is transmitted using a link associated with the RIS.

The transmission component 1104 may transmit, to the receiver, a new sequence associated with the signature of the RIS, where the new sequence identifies the RIS, and where the new sequence is based at least in part on a communication parameter.

The reception component 1102 may receive, from at least one of the transmitter or the receiver, a request to modify the sequence or the signature associated with the RIS.

The determination component 1110 may determine to modify the sequence to the new sequence based at least in part on the communication parameter.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a receiver, comprising: receiving, from a transmitter, an indication of a signature of a reconfigurable intelligent surface (RIS); receiving a signal that is transmitted by the transmitter and redirected by the RIS; and receiving, from the RIS, a sequence associated with the signature of the RIS indicating that the signal is transmitted using a link associated with the RIS.

Aspect 2: The method of Aspect 1, wherein the sequence uses time domain resources or frequency domain resources that are associated with the signal.

Aspect 3: The method of Aspect 1, wherein the sequence uses time domain resources or frequency domain resources that are not associated with the signal.

Aspect 4: The method of any of Aspects 1-3, wherein receiving the signal comprises receiving the signal that includes one or more time domain resources with an attenuated amplitude; and wherein receiving the sequence associated with the signature of the RIS comprises receiving the sequence associated with the signature of the RIS in the one or more time domain resources.

Aspect 5: The method of any of Aspects 1-3, wherein receiving the sequence associated with the signature of the RIS comprises receiving the sequence associated with the signature of the RIS in one or more time domain resources associated with the signal, wherein the signal is superposed by the sequence in the one or more time domain resources.

Aspect 6: The method of any of Aspects 1-3 and 5, wherein receiving the sequence associated with the signature of the RIS comprises receiving the sequence in one or more time domain resources of a time domain resource allocation for the signal.

Aspect 7: The method of any of Aspects 1-3 and 5-6, wherein receiving the sequence associated with the signature of the RIS comprises receiving the sequence in one or more frequency domain resources of a frequency domain resource allocation for the signal.

Aspect 8: The method of any of Aspects 1 and 3, wherein receiving the signal comprises receiving a signal burst including a first set of time domain resources; and wherein receiving the sequence associated with the signature of the RIS comprises receiving the sequence in a second set of time domain resources.

Aspect 9: The method of Aspect 8, wherein the second set of time domain resources are located after the first set of time domain resources or in an uplink to downlink switching gap or a downlink to uplink switching gap.

Aspect 10: The method of Aspect 8, wherein the second set of time domain resources are located in a cyclic prefix of an orthogonal frequency division multiplexing symbol associated with the signal.

Aspect 11: The method of any of Aspects 1, 3, and 8-10, wherein receiving the signal comprises receiving the signal in a first set of frequency domain resources; and wherein receiving the sequence associated with the signature of the RIS comprises receiving the sequence in a second set of frequency domain resources.

Aspect 12: The method of Aspect 11, wherein the second set of frequency domain resources are included in at least one of: a guard band of a carrier bandwidth, one or more frequency domain resources outside of the carrier bandwidth, or one or more frequency domain resources adjacent to the first set of frequency domain resources.

Aspect 13: The method of any of Aspects 1-12, wherein receiving the indication of the signature of the RIS comprises receiving an indication of the sequence associated the signature via at least one of a radio resource control message, a medium access control (MAC) control element (MAC-CE) message, or a downlink control information message.

Aspect 14: The method of any of Aspects 1-13, wherein the sequence associated with the signature of the RIS identifies the RIS and a beam state associated with the RIS.

Aspect 15: The method of any of Aspects 1-14, further comprising: receiving, from the RIS, a new sequence associated with the signature of the RIS, wherein the new sequence identifies the RIS, and wherein the new sequence is based at least in part on a communication parameter.

Aspect 16: The method of Aspect 15, wherein the communication parameter includes at least one of: a signal type of the signal, a modulation and coding scheme, a time domain resource allocation of the signal, a frequency domain resource allocation of the signal, a Doppler spread, or a delay spread.

Aspect 17: The method of any of Aspects 15-16, wherein receiving the new sequence associated with the signature of the RIS comprises decoding the new sequence using one or more candidate sequences to identify the new sequence.

Aspect 18: The method of any of Aspects 15-17, further comprising: transmitting, to at least one of the transmitter or the RIS, a request to modify the sequence or the signature associated with the RIS.

Aspect 19: A method of wireless communication performed by a transmitter, comprising: transmitting, to at least one of a receiver or a reconfigurable intelligent surface (RIS), an indication of a signature of the RIS; and transmitting a signal that is to be redirected to the receiver by the RIS using a link that is identified by a sequence associated with the signature of the RIS.

Aspect 20: The method of Aspect 19, wherein the sequence uses time domain resources or frequency domain resources that are associated with the signal.

Aspect 21: The method of Aspect 19, wherein the sequence uses time domain resources or frequency domain resources that are not associated with the signal.

Aspect 22: The method of any of Aspects 19-21, wherein transmitting the indication of the signature of the RIS comprises transmitting an indication of the sequence associated the signature via at least one of a radio resource control message, a medium access control (MAC) control element (MAC-CE) message, or a downlink control information message.

Aspect 23: The method of any of Aspects 19-22, wherein the sequence associated with the signature of the RIS identifies the RIS and a beam state associated with the RIS.

Aspect 24: The method of any of Aspects 19-23, further comprising: transmitting a new signal that is to be redirected to the receiver by the RIS using the link that is identified by a new sequence associated with the signature of the RIS, wherein the new sequence identifies the RIS, and wherein the new sequence is based at least in part on a communication parameter.

Aspect 25: The method of Aspect 24, wherein the communication parameter includes at least one of: a signal type of the signal, a modulation and coding scheme, a time domain resource allocation of the signal, a frequency domain resource allocation of the signal, a Doppler spread, or a delay spread.

Aspect 26: The method of any of Aspects 24-25, further comprising: transmitting, to at least one of the receiver or the RIS, a request to modify the sequence or the signature associated with the RIS.

Aspect 27: A method of wireless communication performed by a reconfigurable intelligent surface (RIS), comprising: receiving, from a transmitter, an indication of a signature of the reconfigurable intelligent surface (RIS); receiving and redirecting a signal, that is transmitted by the transmitter, to a receiver; and transmitting, to the receiver, a sequence associated with the signature of the RIS indicating that the signal is transmitted using a link associated with the RIS.

Aspect 28: The method of Aspect 27, wherein the sequence uses time domain resources or frequency domain resources that are associated with the signal.

Aspect 29: The method of Aspect 27, wherein the sequence uses time domain resources or frequency domain resources that are not associated with the signal.

Aspect 30: The method of any of Aspects 27-29, wherein receiving and redirecting the signal comprises: receiving, from the transmitter, the signal; modifying an amplitude for one or more time domain resources of the signal by attenuating the amplitude of the signal in the one or more time domain resources; and redirecting the signal that uses one or more time domain resources with an attenuated amplitude; and wherein transmitting the sequence associated with the signature of the RIS comprises transmitting the sequence associated with the signature of the RIS in the one or more time domain resources.

Aspect 31: The method of any of Aspects 27-29, wherein transmitting the sequence associated with the signature of the RIS comprises transmitting the sequence associated with the signature of the RIS in one or more time domain resources associated with the signal, wherein the signal is superposed by the sequence in the one or more time domain resources.

Aspect 32: The method of any of Aspects 27-29 and 31, wherein transmitting the sequence associated with the signature of the RIS comprises transmitting the sequence in one or more time domain resources of a time domain resource allocation for the signal.

Aspect 33: The method of any of Aspects 27-29 and 31-32, wherein transmitting the sequence associated with the signature of the RIS comprises transmitting the sequence in one or more frequency domain resources of a frequency domain resource allocation for the signal.

Aspect 34: The method of any of Aspects 27 and 29, wherein receiving and redirecting the signal comprises receiving a signal burst including a first set of time domain resources; and wherein transmitting the sequence associated with the signature of the RIS comprises transmitting the sequence in a second set of time domain resources.

Aspect 35: The method of Aspect 34, wherein the second set of time domain resources are located after the first set of time domain resources or in an uplink to downlink switching gap or a downlink to uplink switching gap.

Aspect 36: The method of Aspect 34, wherein the second set of time domain resources are located in a cyclic prefix of an orthogonal frequency division multiplexing symbol associated with the signal.

Aspect 37: The method of any of Aspects 27, 29, and 34-36, wherein receiving and redirecting the signal comprises receiving the signal in a first set of frequency domain resources; and wherein transmitting the sequence associated with the signature of the RIS comprises transmitting the sequence in a second set of frequency domain resources.

Aspect 38: The method of Aspect 37, wherein the second set of frequency domain resources are included in at least one of: a guard band of a carrier bandwidth, one or more frequency domain resources outside of the carrier bandwidth, or one or more frequency domain resources adjacent to the first set of frequency domain resources.

Aspect 39: The method of any of Aspects 27-38, wherein receiving the indication of the signature of the RIS comprises receiving an indication of the sequence associated the signature via at least one of a radio resource control message, a medium access control (MAC) control element (MAC-CE) message, or a downlink control information message.

Aspect 40: The method of any of Aspects 27-39, wherein the sequence associated with the signature of the RIS identifies the RIS and a beam state associated with the RIS.

Aspect 41: The method of any of Aspects 27-40, further comprising: transmitting, to the receiver, a new sequence associated with the signature of the RIS, wherein the new sequence identifies the RIS, and wherein the new sequence is based at least in part on a communication parameter.

Aspect 42: The method of Aspect 41, wherein the communication parameter includes at least one of: a signal type of the signal, a modulation and coding scheme, a time domain resource allocation of the signal, a frequency domain resource allocation of the signal, a Doppler spread, or a delay spread.

Aspect 43: The method of any of Aspects 41-42, further comprising: receiving, from at least one of the transmitter or the receiver, a request to modify the sequence or the signature associated with the RIS.

Aspect 44: The method of any of Aspects 41-43, further comprising: determining to modify the sequence to the new sequence based at least in part on the communication parameter.

Aspect 45: An apparatus for wireless communication at a device, comprising a processor; memory coupled with the processor; and instructions stored in the memory and executable by the processor to cause the apparatus to perform the method of one or more of Aspects 1-18.

Aspect 46: A device for wireless communication, comprising a memory and one or more processors coupled to the memory, the one or more processors configured to perform the method of one or more of Aspects 1-18.

Aspect 47: An apparatus for wireless communication, comprising at least one means for performing the method of one or more of Aspects 1-18.

Aspect 48: A non-transitory computer-readable medium storing code for wireless communication, the code comprising instructions executable by a processor to perform the method of one or more of Aspects 1-18.

Aspect 49: A non-transitory computer-readable medium storing a set of instructions for wireless communication, the set of instructions comprising one or more instructions that, when executed by one or more processors of a device, cause the device to perform the method of one or more of Aspects 1-18.

Aspect 50: An apparatus for wireless communication at a device, comprising a processor; memory coupled with the processor; and instructions stored in the memory and executable by the processor to cause the apparatus to perform the method of one or more of Aspects 19-26.

Aspect 51: A device for wireless communication, comprising a memory and one or more processors coupled to the memory, the one or more processors configured to perform the method of one or more of Aspects 19-26.

Aspect 52: An apparatus for wireless communication, comprising at least one means for performing the method of one or more of Aspects 19-26.

Aspect 53: A non-transitory computer-readable medium storing code for wireless communication, the code comprising instructions executable by a processor to perform the method of one or more of Aspects 19-26.

Aspect 54: A non-transitory computer-readable medium storing a set of instructions for wireless communication, the set of instructions comprising one or more instructions that, when executed by one or more processors of a device, cause the device to perform the method of one or more of Aspects 19-26.

Aspect 55: An apparatus for wireless communication at a device, comprising a processor; memory coupled with the processor; and instructions stored in the memory and executable by the processor to cause the apparatus to perform the method of one or more of Aspects 27-44.

Aspect 56: A device for wireless communication, comprising a memory and one or more processors coupled to the memory, the one or more processors configured to perform the method of one or more of Aspects 27-44.

Aspect 57: An apparatus for wireless communication, comprising at least one means for performing the method of one or more of Aspects 27-44.

Aspect 58: A non-transitory computer-readable medium storing code for wireless communication, the code comprising instructions executable by a processor to perform the method of one or more of Aspects 27-44.

Aspect 59: A non-transitory computer-readable medium storing a set of instructions for wireless communication, the set of instructions comprising one or more instructions that, when executed by one or more processors of a device, cause the device to perform the method of one or more of Aspects 27-44.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A receiver for wireless communication, comprising:
a memory; and
one or more processors, coupled to the memory, configured to:
receive, from a transmitter, an indication of a signature of a reconfigurable intelligent surface (RIS);
receive a signal that is transmitted by the transmitter and redirected by the RIS; and
receive, from the RIS and via one or more time domain resources associated with the signal, a sequence associated with the signature of the RIS indicating that the signal is transmitted using a link associated with the RIS, wherein the one or more time domain resources comprise an attenuated amplitude, or
wherein the signal is superposed by the sequence in the one or more time domain resources.

2. The receiver of claim 1, wherein the one or more processors, configured to receive the sequence associated with the signature of the RIS, are configured to receive the sequence in the one or more time domain resources of a time domain resource allocation for the signal.

3. The receiver of claim 1, wherein the one or more processors, configured to receive the sequence associated with the signature of the RIS, are configured to receive the sequence in one or more frequency domain resources of a frequency domain resource allocation for the signal.

4. The receiver of claim 1, wherein the one or more processors, configured to receive the signal, are configured to receive a signal burst including a first set of time domain resources; and
wherein the one or more processors, to receive the sequence associated with the signature of the RIS, are configured to receive the sequence in a second set of time domain resources.

5. The receiver of claim 1, wherein the one or more processors, configured to receive the signal, are configured to receive the signal in a first set of frequency domain resources; and
wherein the one or more processors, to receive the sequence associated with the signature of the RIS, are configured to receive the sequence in a second set of frequency domain resources.

6. The receiver of claim 1, wherein the sequence associated with the signature of the RIS identifies the RIS and a beam state associated with the RIS.

7. The receiver of claim 1, wherein the one or more processors are further configured to:
receive, from the RIS, a new sequence associated with the signature of the RIS, wherein the new sequence identifies the RIS, and wherein the new sequence is based at least in part on a communication parameter.

8. The receiver of claim 7, wherein the one or more processors, configured to receive the new sequence associated with the signature of the RIS, are configured to decode the new sequence using one or more candidate sequences to identify the new sequence.

9. The receiver of claim 7, wherein the one or more processors are further configured to:
transmit, to at least one of the transmitter or the RIS, a request to modify the sequence or the signature associated with the RIS.

10. A reconfigurable intelligent surface (RIS) for wireless communication, comprising:
a memory; and
one or more processors, coupled to the memory, configured to:
receive, from a transmitter, an indication of a signature of the RIS;
receive a signal that is to be redirected to a receiver using a link that is identified by a sequence associated with the signature of the RIS; and
redirect the signal via one or more time domain resources comprising an attenuated amplitude,
wherein the sequence associated with the signature of the RIS is transmitted in the one or more time domain resources, or
redirect the signal via one or more time domain resources, wherein the signal is superposed by the sequence in the one or more time domain resources.

11. The RIS of claim 10, wherein the one or more processors are further configured to:
redirect a new signal to the receiver using the link that is identified by a new sequence associated with the signature of the RIS, wherein the new sequence identifies the RIS, and wherein the new sequence is based at least in part on a communication parameter.

12. A method of wireless communication performed by a receiver, comprising:
receiving, from a transmitter, an indication of a signature of a reconfigurable intelligent surface (RIS);
receiving a signal that is transmitted by the transmitter and redirected by the RIS; and
receiving, from the RIS, a sequence associated with the signature of the RIS indicating that the signal is transmitted using a link associated with the RIS, wherein the signal includes one or more time domain resources with an attenuated amplitude and the sequence is received in the one or more time domain resources.

13. The method of claim 12, wherein receiving the sequence associated with the signature of the RIS comprises receiving the sequence in the one or more time domain resources of a time domain resource allocation for the signal.

14. The method of claim 12, wherein receiving the sequence associated with the signature of the RIS comprises receiving the sequence in one or more frequency domain resources of a frequency domain resource allocation for the signal.

15. The method of claim 12, wherein receiving the signal comprises receiving a signal burst including a first set of time domain resources; and
wherein receiving the sequence associated with the signature of the RIS comprises receiving the sequence in a second set of time domain resources.

16. The method of claim 12, wherein receiving the signal comprises receiving the signal in a first set of frequency domain resources; and
wherein receiving the sequence associated with the signature of the RIS comprises receiving the sequence in a second set of frequency domain resources.

17. The method of claim 12, wherein the sequence associated with the signature of the RIS identifies the RIS and a beam state associated with the RIS.

18. The method of claim 12, further comprising:
receiving, from the RIS, a new sequence associated with the signature of the RIS, wherein the new sequence identifies the RIS, and wherein the new sequence is based at least in part on a communication parameter.

19. The method of claim 18, wherein receiving the new sequence associated with the signature of the RIS comprises decoding the new sequence using one or more candidate sequences to identify the new sequence.

20. The method of claim 18, further comprising:
transmitting, to at least one of the transmitter or the RIS, a request to modify the sequence or the signature associated with the RIS.

21. A method of wireless communication performed by a reconfigurable intelligent surface (RIS), comprising:
receiving an indication of a signature of the RIS; and
receiving a signal that is to be redirected to a receiver using a link that is identified by a sequence associated with the signature of the RIS; and
redirecting the signal via one or more time domain resources comprising an attenuated amplitude,
wherein the sequence is transmitted in the one or more time domain resources, or
redirecting the signal via one or more time domain resources, wherein the signal is superposed by the sequence in the one or more time domain resources.

22. The method of claim 21, wherein the one or more time domain resources are associated with the signal.

23. The method of claim 21, further comprising:
redirecting a new signal to the receiver using the link that is identified by a new sequence associated with the signature of the RIS, wherein the new sequence identifies the RIS, and wherein the new sequence is based at least in part on a communication parameter.

24. The RIS of claim 10, wherein the one or more processors are further configured to:
receive information indicating one or more of:
a pattern associated with a transmission of the indication of the signature of the RIS, a periodicity associated with the transmission of the indication of the signature of the RIS, a duration associated with the transmission of the indication of the signature of the RIS, or
a frequency associated with the transmission of the indication of the signature of the RIS.

25. The RIS of claim 10, wherein the RIS is configured with one or more switching gaps.

26. The method of claim 21, further comprising: receiving information indicating one or more of:
a pattern associated with a transmission of the indication of the signature of the RIS, a periodicity associated with the transmission of the indication of the signature of the RIS, a duration associated with the transmission of the indication of the signature of the RIS, or
a frequency associated with the transmission of the indication of the signature of the RIS.

27. The method of claim 21,
wherein the RIS is configured with one or more switching gaps.

28. The RIS of claim 10, wherein the indication of the signature of the RIS is received via one or more of system information signaling, radio resource control (RRC) signaling, or medium access control (MAC) signaling.

29. The RIS of claim 10, wherein the indication of the signature of the RIS is received via configuration information, and wherein the configuration information indicates multiple RIS signatures associated with the RIS.

30. The method of claim 21, wherein the indication of the signature of the RIS is received via one or more of system information signaling, radio resource control (RRC) signaling, or medium access control (MAC) signaling.

* * * * *